US010969675B1

(12) United States Patent
Wheelwright et al.

(10) Patent No.: US 10,969,675 B1
(45) Date of Patent: Apr. 6, 2021

(54) OPTICAL ASSEMBLIES HAVING SCANNING REFLECTORS FOR PROJECTING AUGMENTED REALITY CONTENT

(71) Applicant: FACEBOOK TECHNOLOGIES, LLC, Menlo Park, CA (US)

(72) Inventors: Brian Wheelwright, Sammamish, WA (US); Yun-Han Lee, Redmond, WA (US); Babak Amirsolaimani, Redmond, WA (US); Weichuan Gao, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/436,736

(22) Filed: Jun. 10, 2019

(51) Int. Cl.
| | |
|---|---|
| *G03B 21/28* | (2006.01) |
| *G02B 26/12* | (2006.01) |
| *G02B 27/30* | (2006.01) |
| *G02F 1/1335* | (2006.01) |
| *G02B 27/01* | (2006.01) |

(52) U.S. Cl.
CPC ............. *G03B 21/28* (2013.01); *G02B 26/12* (2013.01); *G02B 27/30* (2013.01); *G02F 1/133528* (2013.01); *G02B 27/017* (2013.01)

(58) Field of Classification Search
CPC ... G02B 27/01–0189; G02B 2027/0105–0198; G03B 21/00–64; H04N 9/31–3197
See application file for complete search history.

(56) References Cited

U.S. PATENT DOCUMENTS

| | | | |
|---|---|---|---|
| 5,726,807 A | 3/1998 | Nakaoka et al. | |
| 5,949,583 A | 9/1999 | Rallison et al. | |
| 6,097,543 A | 8/2000 | Rallison et al. | |
| 10,649,210 B2 | 5/2020 | Cobb et al. | |
| 2006/0268421 A1* | 11/2006 | Shimizu ............. | G02B 27/0172 359/630 |
| 2017/0010466 A1* | 1/2017 | Klug ................... | G02B 26/103 |
| 2018/0082644 A1* | 3/2018 | Bohn ................. | G02B 27/0172 |
| 2018/0120559 A1* | 5/2018 | Yeoh ................... | G02B 5/3083 |
| 2018/0164583 A1 | 6/2018 | Wall et al. | |
| 2019/0179149 A1* | 6/2019 | Curtis ................ | G02B 27/0176 |

OTHER PUBLICATIONS

Wheelwright, Office Action, U.S. Appl. No. 16/436,729, dated May 22, 2020, 14 pgs.

* cited by examiner

*Primary Examiner* — Christina A Riddle
*Assistant Examiner* — Christopher A Lamb, II
(74) *Attorney, Agent, or Firm* — Morgan, Lewis & Bockius LLP

(57) ABSTRACT

An optical assembly includes a first optical waveguide, a first in-coupler coupled with the first optical waveguide and a projector configured to project image light toward a first side of the first optical waveguide. The optical assembly also includes a first scanning reflector optically coupled with the projector and disposed on a second side of the first optical waveguide that is opposite to the first side. The projector is configured to project image light. The first scanning reflector is configured to receive the image light and to redirect the image light across a first range of directions. The first in-coupler is configured to redirect a first portion of the image light so that the first portion of the image light undergoes total internal reflection inside the first optical waveguide.

18 Claims, 17 Drawing Sheets

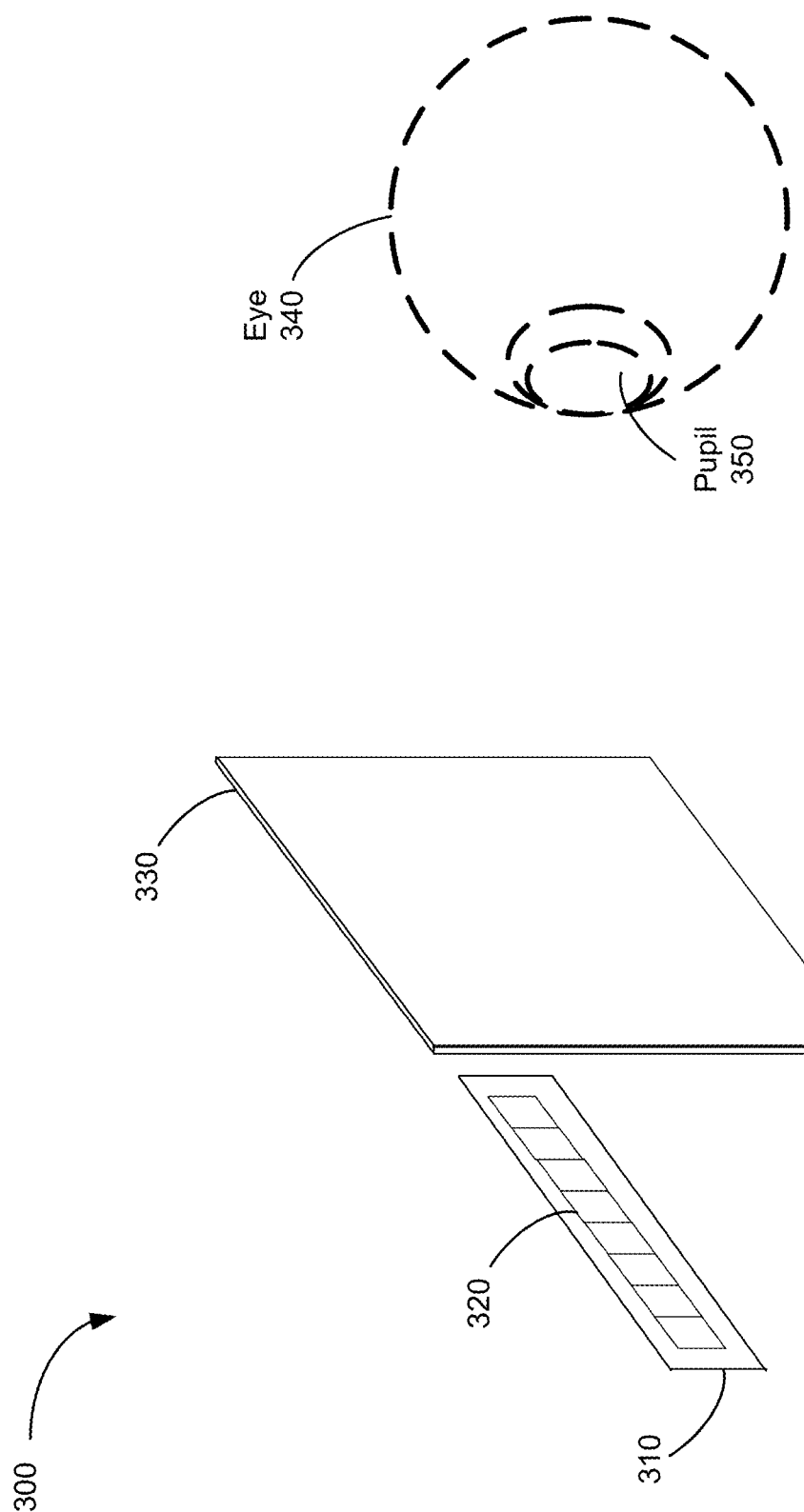

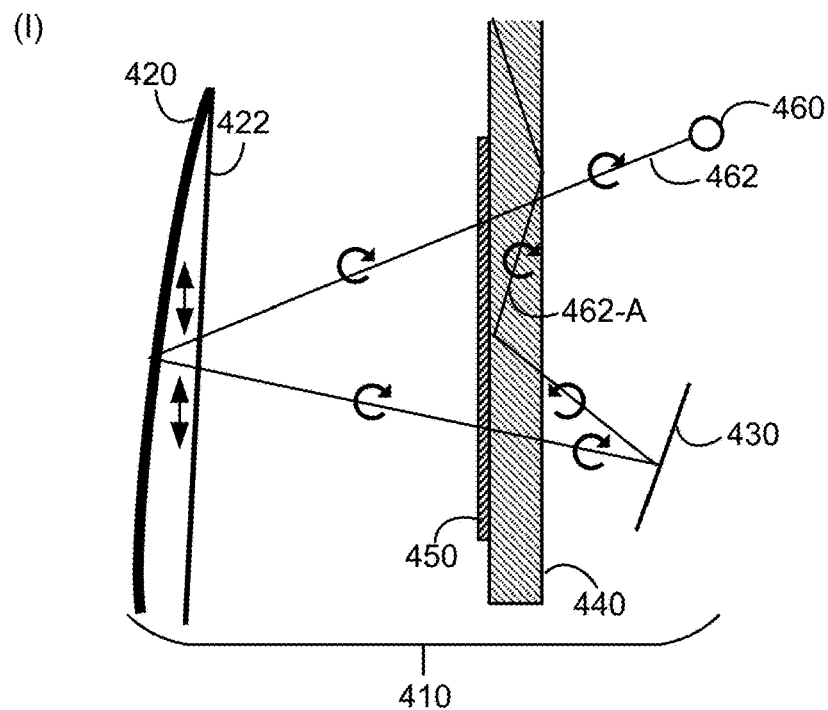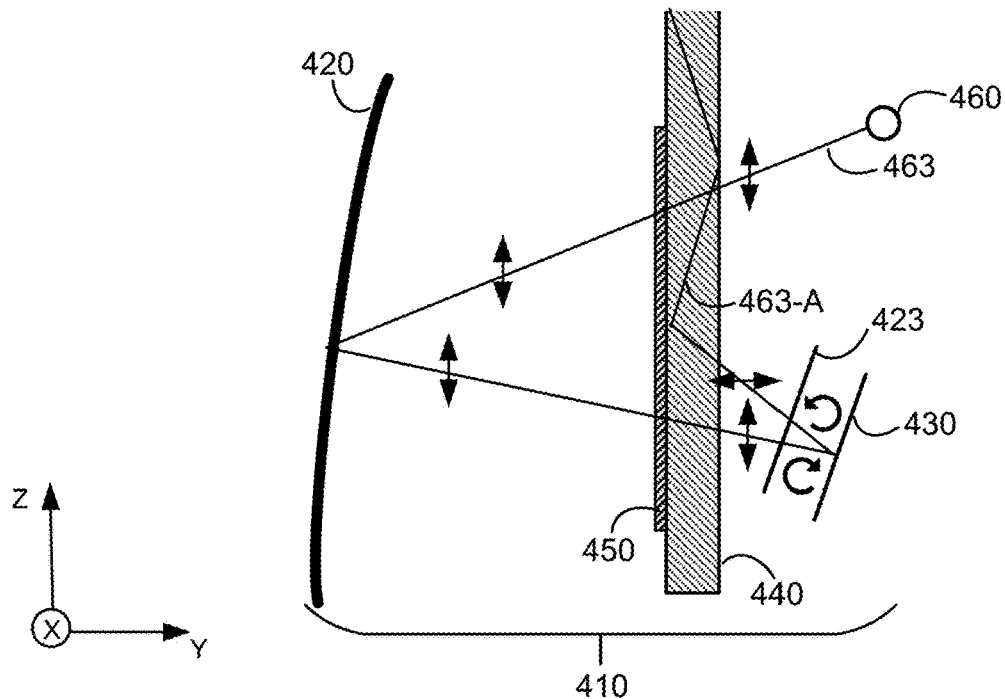
Figure 4C

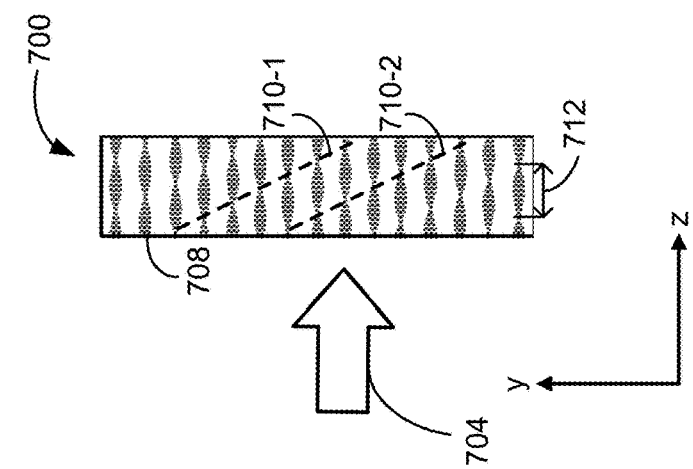
Figure 7C
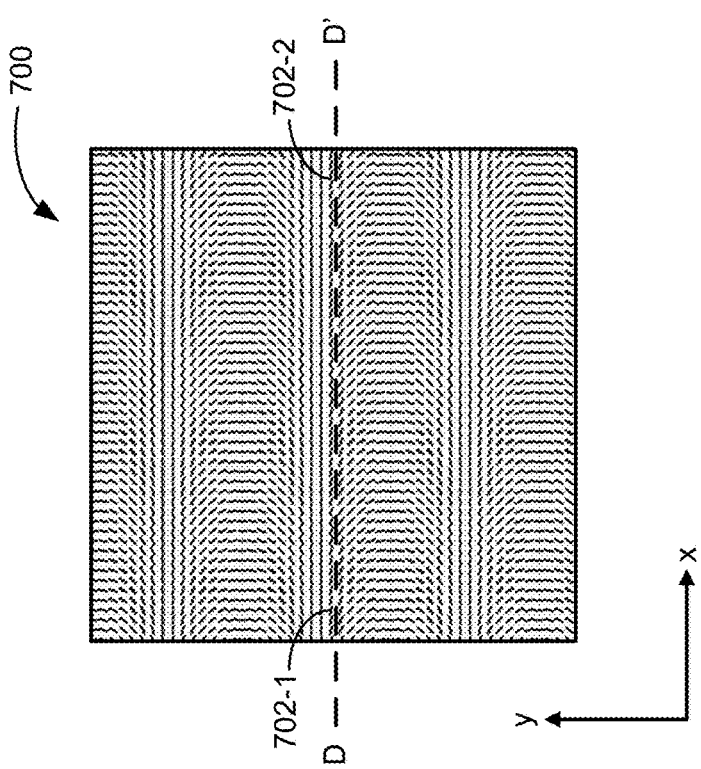
Figure 7B
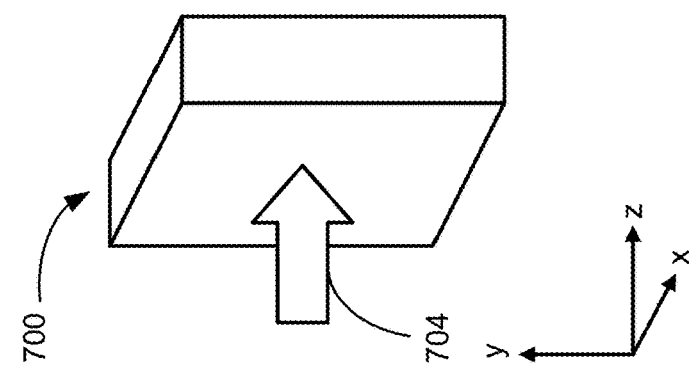
Figure 7A
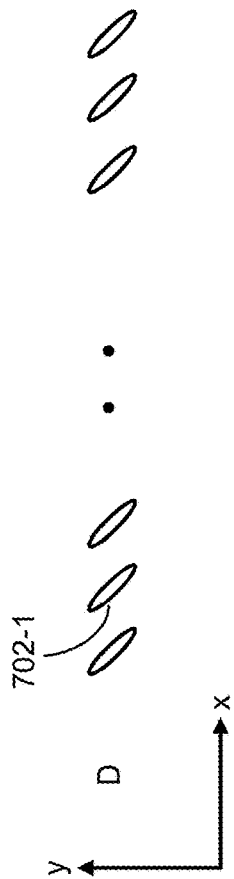
Figure 7D

OPTICAL ASSEMBLIES HAVING SCANNING REFLECTORS FOR PROJECTING AUGMENTED REALITY CONTENT

RELATED APPLICATIONS

This application is related to U.S. patent application Ser. No. 16/436,729, entitled "Optical Assemblies Having Polarization Volume Gratings for Projecting Augmented Reality Content" filed Jun. 10, 2019 and U.S. patent application Ser. No. 16/438,034, entitled "Optical Devices Including Reflective Spatial Light Modulators for Projecting Augmented Reality Content" filed Jun. 11, 2019.

TECHNICAL FIELD

This relates generally to display devices, and more specifically to head-mounted display devices.

BACKGROUND

Head-mounted display devices (also called head-mounted displays) are gaining popularity as means for providing visual information to a user. For example, the head-mounted display devices are used for virtual reality and augmented reality operations. However, the size and weight of conventional head-mounted displays limit their applications.

Generally, head-mounted display devices with a wide field of view are desired for improved user experience. This makes it even more challenging to reduce the sizes of head-mounted display devices.

SUMMARY

Accordingly, there is a need for compact head-mounted display devices capable of rendering images with a wide field of view to enhance users' overall experience of augmented, mixed, and/or virtual reality.

The above deficiencies and other problems associated with conventional head-mounted displays are reduced or eliminated by the disclosed optical assembly configured to direct light from a display to a user's eye. The optical assembly has a compact configuration that provides a folded optical path for projecting images from the display to the user's eye, thereby increasing an effective focal length for projecting the images. The increased effective focal length results in a wider field of view for a head-mounted display device employing the optical assembly.

In accordance with some embodiments, an optical assembly includes a first optical waveguide, a first in-coupler coupled with the first optical waveguide and a projector configured to project image light toward a first side of the first optical waveguide. The optical assembly also includes a first scanning reflector optically coupled with the projector and disposed on a second side of the first optical waveguide that is opposite to the first side. The first scanning reflector is configured to receive the image light and to redirect the image light across a first range of directions. The first in-coupler is configured to redirect a first portion of the image light so that the first portion of the image light undergoes total internal reflection inside the first optical waveguide.

In accordance with some embodiments, a display device is includes a display configured to project image light, a first optical waveguide, a first in-coupler coupled with the first optical waveguide and a projector configured to project image light toward a first side of the first optical waveguide. The display device also includes a first scanning reflector optically coupled with the projector disposed on a second side of the first optical waveguide that is opposite to the first side. The first scanning reflector is configured to receive the image light and to redirect the image light across a first range of directions. The first in-coupler is configured to redirect a first portion of the image light so that the first portion of the image light undergoes total internal reflection inside the first optical waveguide.

In accordance with some embodiments, a method for projecting image light includes projecting, with a projector, image light toward a first side of a first optical waveguide and receiving, with a first scanning reflector, the image light. The method also includes redirecting, with the first scanning reflector, the image light across a first range of directions toward a first in-coupler coupled to the first optical waveguide and redirecting, with the first in-coupler, a first portion of the image light so that the first portion of the image light undergoes total internal reflection inside the first optical waveguide. The first scanning reflector is disposed on a second side of the first optical waveguide that is opposite to the first side.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

FIG. 4C includes schematic diagrams illustrating propagation of circularly polarized light (Diagram (I)) and linearly polarized light (Diagram (II)) through an optical assembly in accordance with some embodiments.

FIGS. 7A-7D are schematic diagrams illustrating a polarization volume grating in accordance with some embodiments.

Figure 1:
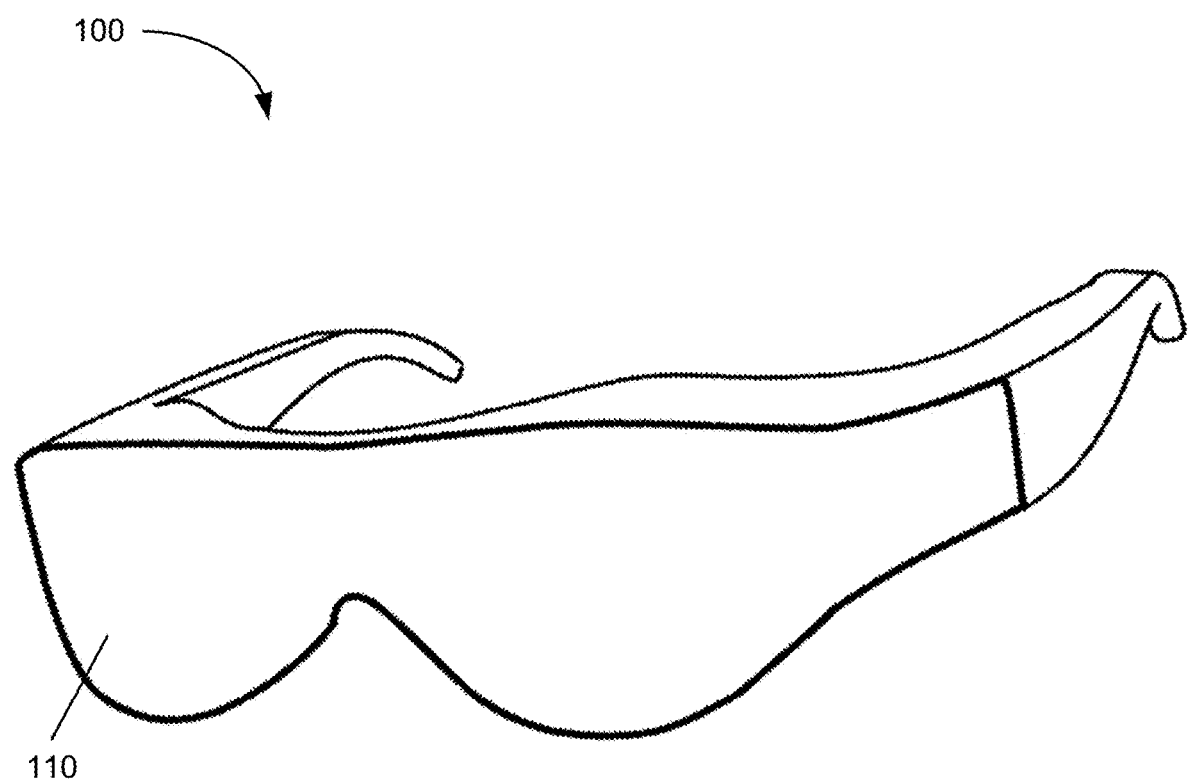
FIG. 1 is a perspective view of a display device in accordance with some embodiments.

These figures are not drawn to scale unless indicated otherwise.

DETAILED DESCRIPTION

The present disclosure provides a head-mounted display device (or a display device) including an optical assembly for projecting augmented reality content to an eye of a user. The optical assembly includes one or more scanning reflectors (e.g., micro-electro-mechanical system (MEMS) mirrors) and one or more polarization selective in-couplers, each in-coupler coupled with an optical waveguide. The optical assembly is configured to receive image light from a display. The image light from the display corresponds to images including augmented reality content. The one or more optical waveguides of the optical assembly are configured to output at least a portion of the image light toward the eye of the user. The one or more waveguides are also configured to transmit light from outside the display device, thereby combining the images from the display with a real-world view.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first optical waveguide could be termed a second optical waveguide, and, similarly, a second optical waveguide could be termed a first optical waveguide, without departing from the scope of the various described embodiments. The first optical waveguide and the second optical waveguide are both optical waveguide, but they are not the same optical waveguide.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates a perspective view of display device 100 in accordance with some embodiments. In some embodiments, display device 100 is configured to be worn on the head of a user (e.g., by having the form of spectacles, goggles, or eyeglasses, as shown in FIG. 1, or to be included as part of a helmet or a hat that is to be worn by the user). When display device 100 is configured to be worn on the head of a user, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed-reality contents, or any combination thereof) to a user. In some embodiments, display 110 is a clip-on display. A clip-on display is configured to be coupled (e.g., clipped on) to a frame of a headset (e.g., a frame of goggles) for displaying visual content. The clip-on display is further configured to be un-coupled from the frame of the headset.

Figure 2:
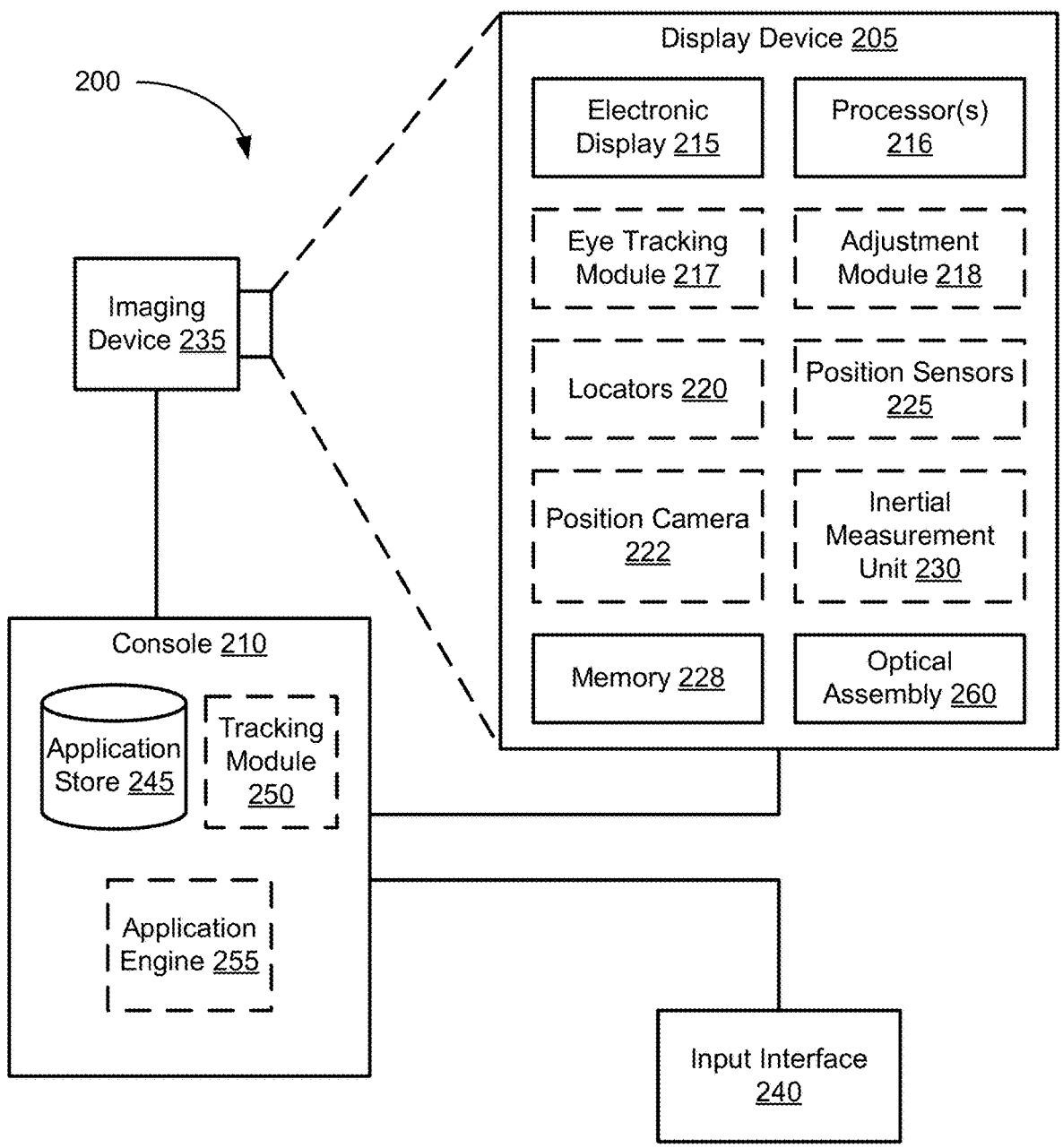
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed-reality by adding in a view of the real surroundings. Thus, display device 205 and system 200 described here can deliver augmented reality, virtual reality, and/or mixed-reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or as some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more optical assemblies 260, or a subset or superset thereof (e.g., display device 205 with electronic display 215, optical assembly 260, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM, or other random access solid state memory device; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to project images to the user through one or more optical assemblies 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of light emission devices include: an organic light emitting diode, an active-matrix organic light-emitting diode, a light emitting diode, some type of device capable of being placed in a flexible display, or some combination thereof. Light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more optical components in the one or more optical assemblies 260 direct light from the arrays of light emission devices (optionally through the emission intensity arrays) to locations within each eyebox. An eyebox is a region that is occupied by an eye of a user of display device 205 (e.g., a user wearing display device 205) who is viewing images from display device 205. In some embodiments, the eyebox is represented as a 10 mm×10 mm square. In some embodiments, the one or more optical components include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is also used to determine the location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., a user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, it sends a discrete image to the display, which will tile sub-images together thus allowing a coherent stitched image to appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to the motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; in practice, however, the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so that it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field-of-view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more optical assemblies 260, which can include a single optical assembly 260 or multiple optical assemblies 260 (e.g., an optical assembly 260 for each eye of a user). In some embodiments, the one or more optical assemblies 260 receive image light for the computer generated images from the electronic display 215 and direct the image light toward an eye or eyes of a user. The computer-generated images include still images, animated images, and/or a combination thereof. The computer-generated images include objects that appear to be two-dimensional and/or three-dimensional objects.

In some embodiments, electronic display 215 projects computer-generated images to one or more reflective elements (not shown), and the one or more optical assemblies 260 receive the image light from the one or more reflective elements and direct the image light to the eye(s) of the user. In some embodiments, the one or more reflective elements are partially transparent (e.g., the one or more reflective elements have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions that when executed by a processor is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of a display device 300, which corresponds to part of or all of display device 100 (see FIG. 1) in accordance with some embodiments. In some embodiments, display device 300 includes a light source 310 (e.g., a light emitting surface or a display), and an optical assembly (e.g., optical assembly 260) having one or more optical components 330 (e.g., one or more of lenses, reflectors, waveguides, and/or polarization selective elements described below with respect to FIGS. 4A-7D).

In some embodiments, light source 310 is an array a light emission devices emitting image light toward one or more optical components 330. As shown in FIG. 3, light source 310 includes light emission devices 320 (e.g., a line array or a one dimensional array of light emission devices 320) that emit light in the visible region. Light emission device 310 may be, e.g., an array of LEDs, an array of microLEDs, an array of OLEDs, or some combination thereof. In some embodiments, light source 310 is a point source including a single light emission device 320.

In some embodiments, display device 300 includes an emission intensity array configured to selectively attenuate light emitted from light source 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from light source 310 is passed to the one or more optical components 330. In some embodiments, display device 300 uses an emission intensity array to facilitate providing image light to a location of pupil 350 of eye 340 of a user, and minimize the amount of image light provided to other areas in the eyebox.

In some embodiments, light source 310 and an emission intensity array make up a display element. Alternatively, the display element includes light source 310 (e.g., when light source 310 includes individually adjustable pixels) without the emission intensity array. In some embodiments, display device 300 includes one or more broadband sources (e.g., one or more white LEDs) coupled with a plurality of color filters, in addition to, or instead of, light source 310.

One or more optical components 330 receive the image light (or modified image light, e.g., attenuated light) from light source 310, and direct the image light to a detected or presumed location of the pupil 350 of an eye 340 of a user. In some embodiments, the one or more optical components include one or more optical assemblies 260.

Figure 4A:
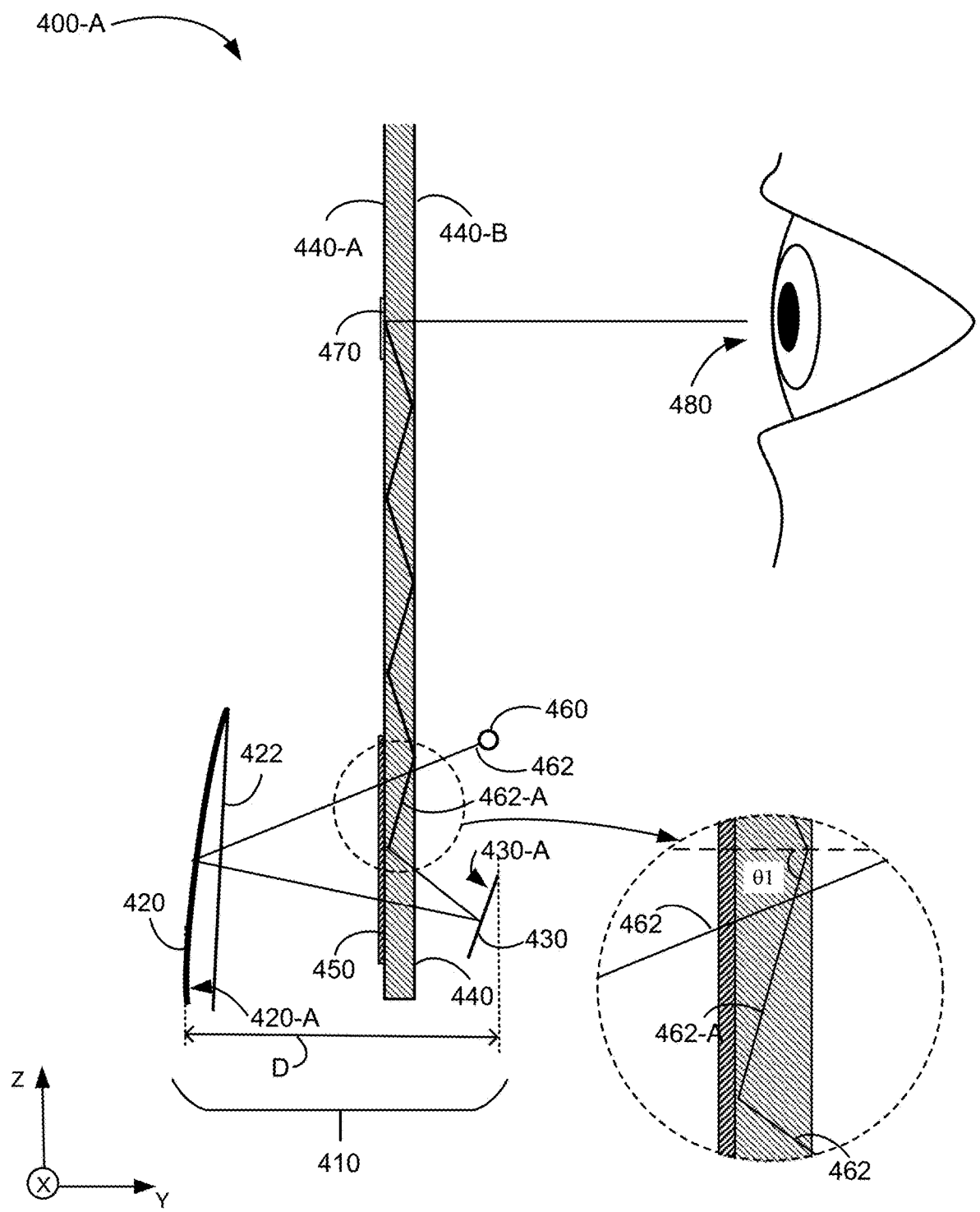
FIG. 4A is a schematic diagram illustrating a display device in accordance with some embodiments.

FIG. 4A is a schematic diagram illustrating display device 400-A in accordance with some embodiments. Display device 400-A includes a light source 460 configured to emit image light 462 and optical assembly 410 for projecting image light 462 to eye 480 of a user of display device 400-A, according to some embodiments. As shown in FIG. 4A, optical assembly 410 includes first optical waveguide 440, first in-coupler 450 coupled with first optical waveguide 440, first reflector 420, and first scanning reflector 430.

In some embodiments, as shown in FIG. 4A, first reflector 420 is disposed on first side 440-A of first optical waveguide 440 and first scanning reflector 430 is disposed on second side 440-B of first optical waveguide 440 that is opposite to first side 440-A. In some embodiments, first reflector 420 has reflecting surface 420-A facing first side 440-A of first optical waveguide 440 and first scanning reflector 430 has reflecting surface 430-A facing second side 440-B of first optical waveguide 440.

First in-coupler 450 is a polarization selective element selective either on linearly polarized light or circularly polarized light. For example, a polarization selective element transmits light having a first polarization (e.g., a first circular polarization or a first linear polarization) and redirects light having a second polarization distinct from the first polarization (e.g., a second circular polarization opposite to the first circular polarization or a second linear polarization orthogonal to the first linear polarization). In some embodiments, first in-coupler 450 is a liquid crystal based polarization selective element, a polarization selective element including a metasurface, a polarization selective element including a resonant structured surface, a polarization selective element including a continuous chiral layer, or a polarization selective element including a birefringent material. For example, a polarization selective element including a continuous chiral layer can be selective on circularly polarized light. As another example, a polarization selective element including a metasurface or resonant structures can be selective either on linearly polarized light or circularly polarized light. In some embodiments, first in-coupler 450 is a polarization volume grating (PVG) (e.g., a polarization volume grating 700 described below with respect to FIGS. 7A-7D). A PVG (e.g., PVG 700) is selective with respect to circular polarization, incident angle, and/or wavelength range of light incident thereon. For example, PVG 700 may transmit light having a first circular polarization and diffract light having a circular polarization that is orthogonal to the first circular polarization.

In FIG. 4A, display device 400-A includes in-coupler 450 that is selective on circular polarization (e.g., in-coupler 450 is PVG 700 described with respect to FIGS. 7A-7D). Distinctions between propagation of linearly polarized light and circularly polarized light in display device 400-A are discussed below with respect to Diagrams (I) and (II) of FIG. 4C.

First reflector 420 is configured to reflect image light 462 projected by light source 460. Image light 462 reflected off of first reflector 420 has a first circular polarization. First in-coupler 450 and first optical waveguide 440 are configured to transmit image light 462 propagating from the first reflector 420 to first scanning reflector 430, without changing its polarization, such that image light 462 incident on first scanning reflector 430 has the first circular polarization. First scanning reflector 430 is configured to receive image light 462 reflected off first reflector 420 and to redirect image light 462 across a first range of directions. The reflection off of first scanning reflector 430 converts the polarization of image light 462 to a second circular polarization. The second circular polarization is distinct from the first circular polarization (i.e., the first circular polarization corresponds to right-handed circular polarization and the second circular polarization corresponds to left-handed circular polarization, or vice versa).

First in-coupler 450 is configured to receive image light 462 having the second circular polarization redirected by first scanning reflector 430 in the first range of directions and diffract at least a portion of image light 462, i.e., first portion 462-A of image light 462. Due to the redirection by first in-coupler 450, first portion 462-A of image light 462 impinges on a surface of first optical waveguide 440 at an incident angle $\theta_1$ that is above a critical angle associated with first optical waveguide 440, as shown in the inset of FIG. 4A. The critical angle refers to an angle of incidence above which light passing through a denser medium (e.g., waveguide 440) to a surface of a less dense medium (e.g., air outside waveguide 440) is totally reflected (i.e., the critical angle is an angle of incidence above which a total internal reflection occurs). First portion 462-A of image light 462 thereby undergoes total internal reflection inside first optical waveguide 440 and propagates through the waveguide via repeated occurrences of total internal reflection, as shown by the zig-zagging light path of first portion 462-A of image light 462 in FIG. 4A.

In some embodiments, light source 460 is a linear array of light emitting devices arranged along a first axis, e.g., the x-axis as shown in FIG. 4A. In some embodiments, light source 460 corresponds to light source 310 (e.g., a light emitting surface or a display) of display device 300.

In some embodiments, first scanning reflector 430 includes a micro-electro-mechanical system (MEMS) mirror (e.g., a microscanner or a micro-scanning mirror). A MEMS mirror includes a reflective surface (e.g., reflecting surface 430-A of first scanning reflector 430) coupled with a microactuator and is configured to dynamically change direction of light incident thereon. A MEMS mirror can have rotational and/or translatory movement along one or two axes. In optical assembly 410, first scanning reflector 430 is configured to redirect image light 462 in a first range of directions. In some embodiments, the first range of directions includes directions in a plane perpendicular to the first axis corresponding to the arrangement of linear array of light emitting devices of light source 460. In FIG. 4A, light source 460 is a linear array of light emitting devices arranged along the x-axis configured to project image light 462 and first scanning reflector 430 is configured to redirect image light 462 to direction corresponding to a plane perpendicular to the x-axis (e.g., a y-z-plane). First scanning reflector 430 is configured to scan image light 462 across the plane at such a frequency that image light 462 received by eye 470 of the user of the display device 400-A is perceived as a two-dimensional image.

As shown in FIG. 4A, in some embodiments, first reflector 420 has a curved shape. First reflector 420 having the curved shape is configured to focus image light 462 as it is reflected such that image light 462 reflected off first reflector 420 is more collimated than image light 462 received by first reflector 420. In some embodiments, first reflector 420 having the curved shape collimates image light 462.

In some embodiments, optical assembly 410 further includes optical retarder 422 (e.g., a quarter-wave plate). In some embodiments, optical retarder 422 is disposed between first in-coupler 450 and first reflector 420, as shown in FIG. 4A. Optical retarder 422 is configured to convert the polarization of light from circular polarization to linear polarization, and vice versa. Optical retarder 422 receives image light 462 having first circular polarization that is projected by light source 460 and transmitted through first optical waveguide 440 and first in-coupler 450. Optical retarder 422 converts the polarization of image light 462 to linear polarization before image light 462 is incident on first reflector 420. Image light 462 having linear polarization is then reflected off first reflector 420 without change of polarization. Optical retarder 422 receives image light 462 reflected off first reflector 420 and converts the polarization of image light 462 back to the first circular polarization while transmitting it.

As show in FIG. 4A, display device 400-A further includes one or more output couplers 470 coupled with first optical waveguide 440. One or more output couplers 470 are positioned at a distance from first in-coupler 450. One or more output couplers 470 are configured to redirect at least a portion of first portion 462-A of image light 462 out of first optical waveguide 440 toward eye 480 of the user. In some embodiments, one or more output couplers 470 include one or more surface relief gratings. In some embodiments, one or more output couplers 470 include volume holographic gratings or embedded partial mirrors. In some embodiments, one or more output couplers 470 include one or more reflectors, one or more partial reflectors, one or more gratings, one or more tunable liquid crystal components, and/or one or more polarization volume gratings. In some embodiments, one or more output couplers 470 are configured to redirect a portion of first portion 462-A of image light 462 while also expanding etendue of image light 462 in optical assembly 410. Etendue refers to a property of light in an optical system characterizing how "spread out" the light is in area and angle. An original input pupil area of light 462 is increased by replication due to multiple interactions with one or more output couplers 470.

In some embodiments, display device 400-A is a head-mounted display device. In some embodiments, display device 400-A corresponds to display device 100 described above with respect to FIG. 1. In some embodiments, display device 400-A is a clip-on display configured to be coupled to a frame of a headset (e.g., a frame of goggles).

Optical assembly 410 provides a folded optical path from light source 460 to eye 480 of the user, resulting in an increased field-of view while maintaining a compact size of optical assembly 410 for head-mounted display devices. In some embodiments, distance D corresponding to a distance between first reflector 420 and first scanning reflector 430 is equal to, or less than, 3 mm, 5 mm, 7 mm, 10 mm, 15 mm, 20 mm, 25 mm, or 30 mm, while an optical path provided by optical assembly 410 can be longer than, e.g., two, three, or even five times, distance D.

Figure 4B:
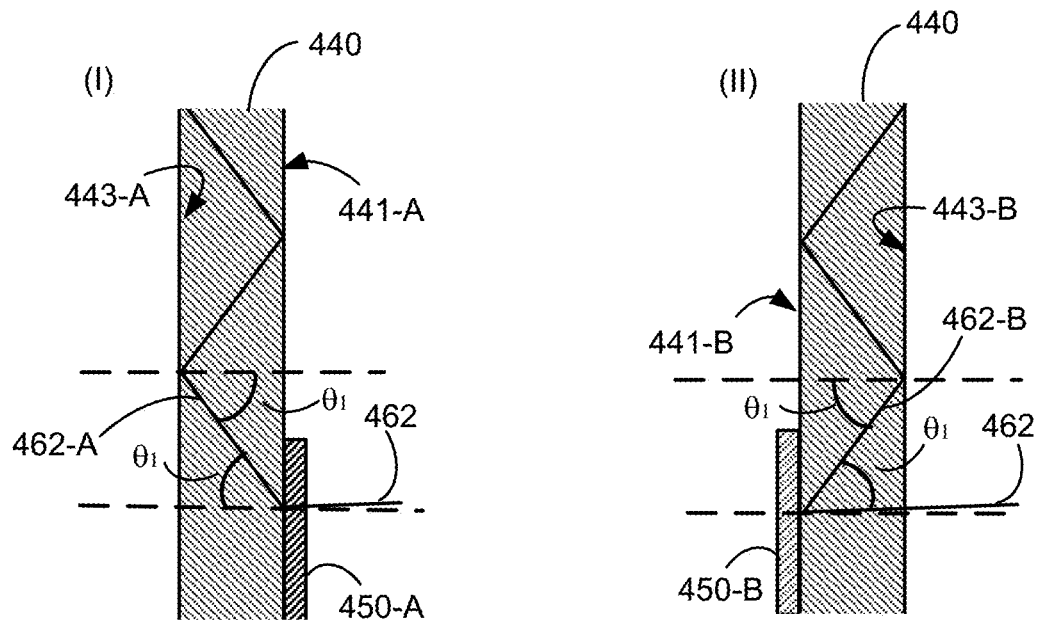
FIG. 4B includes schematic diagrams illustrating a transmission polarization volume grating (Diagram (I)) and a reflective polarization volume grating (Diagram (II)) in accordance with some embodiments.

First in-coupler 450 can be a transmission grating or a reflective grating. FIG. 4B includes schematic diagrams illustrating transmission grating 450-A coupled with first optical waveguide 440 (Diagram (I)) and reflective grating 450-B coupled with first optical waveguide 440 (Diagram (II)), in accordance with some embodiments. Either transmission grating 450-A or reflective grating 450-B can be used as first in-coupler 450 of display device 400-A. Transmission grating 450-A and reflective grating 450-B are each configured to transmit light having the first circular polarization without changing its direction or polarization. Transmission grating 450-A is further configured to transmit and redirect light having the second circular polarization. Reflective grating 450-B is further configured to reflect and redirect the light having the second circular polarization. Diagram (I) of FIG. 4B shows transmission grating 450-A being employed as first in-coupler 450 in optical assembly 410 and disposed on external surface 441-A of first optical waveguide 440, so that image light 462 impinges on first in-coupler 450 before propagating through any portion of first optical waveguide 440. Transmission grating 450-A is configured to redirect first portion 462-A of image light 462 such that first portion 462-A of image light 462 enters first optical waveguide 440 at the incident angle $\theta_1$ that is greater than the critical angle associated with first optical waveguide 440. First portion 462-A of image light 462 thereby undergoes total internal reflection as it impinges on opposite internal surface 443-A of first optical waveguide 440. Diagram (II) of FIG. 4B shows reflective grating 450-B disposed on external surface 441-B of first optical waveguide 440 so that image light 462 propagates through first optical waveguide 440 prior to impinging on reflective polarization volume grating 450-B. Reflective grating 450-B is configured to deflect first portion 462-A of image light 462 toward opposing internal surface 443-B of first optical waveguide 440 such that the first portion 462-A of image light 462 impinges on opposing internal surface 443-B at the incident angle $\theta_1$ that is greater than the critical angle associated with first optical waveguide 440. First portion 462-A of image light 462 thereby undergoes total internal reflection and continues to propagate along first optical waveguide 440.

In some embodiments, transmission grating 450-A or reflective grating 450-B can be a thin film coated on an external surface of first optical waveguide 440. In some embodiments, transmission grating 450-A or reflective grating 450-B can be at least partially embedded in first optical waveguide 440.

FIG. 4C includes schematic diagrams illustrating propagation of circularly polarized image light 462 (Diagram (I)) and linearly polarized image light 463 (Diagram (II)) through an optical assembly in accordance with some embodiments.

In Diagram (I), light source 460 is configured to project image light 462 having the first circular polarization. First optical waveguide 440 and first in-coupler 450 are configured to transmit image light 462 having the first circular polarization without changing its direction or polarization. Optical retarder 422 is configured to receive image light 462 and transmit image light 462 to first reflector 420 while changing its polarization to linear polarization. First reflector 420 is configured to reflect image light 462 having the linear polarization without changing its polarization. Optical retarder 422 is then configured to receive image light 462 having the linear polarization and convert the polarization back to the first circular polarization while transmitting image light 462, through first optical waveguide 440 and first in-coupler 450, to first scanning reflector 430. First scanning reflector 430 receives image light 462 having the first circular polarization and redirects the light toward the first in-coupler 450 while changing its polarization from the first circular polarization to the second circular polarization. First in-coupler 450 is configured to receive the image light 460 having the second circular polarization and redirect first portion 462-A of image light 462 such that first portion 462-A of image light 462 goes through internal reflection inside first optical waveguide 440. Consequently, first in-coupler 450 converts the polarization of first portion 462-A of image light 462 from the second circular polarization to the first circular polarization. In Diagram (II) light source 460 is configured to project image light 463 having a first linear polarization. First optical waveguide 440 and first in-coupler 450 are configured to transmit image light 463 having the first linear polarization without changing its direction or polarization. First reflector 420 is configured to reflect image light 463 having the first linear polarization without changing its polarization through first optical waveguide 440 and first in-coupler 450. In Diagram (II), optical retarder 423 corresponding to optical retarder 422 of Diagram (I) is positioned between optical waveguide 440 and scanning reflector 430. Optical retarder 423 is configured to receive image light 463 and transmit image light 463 to scanning reflector 430 while changing its polarization to a first circular polarization. Scanning reflector 430 is configured to reflect image light 463 having the first circular polarization while changing its polarization to the second circular polarization. Optical retarder 423 is then configured to receive image light 463 having the second circular polarization and convert the polarization back to a second linear polarization while transmitting image light 462 through first optical waveguide 440 to first in-coupler 450. The second linear polarization is orthogonal to the first linear polarization. First in-coupler 450 is configured to redirect portion 463-A of image light 463 such that portion 463-A propagates through first optical waveguide 440.

Figure 4D:
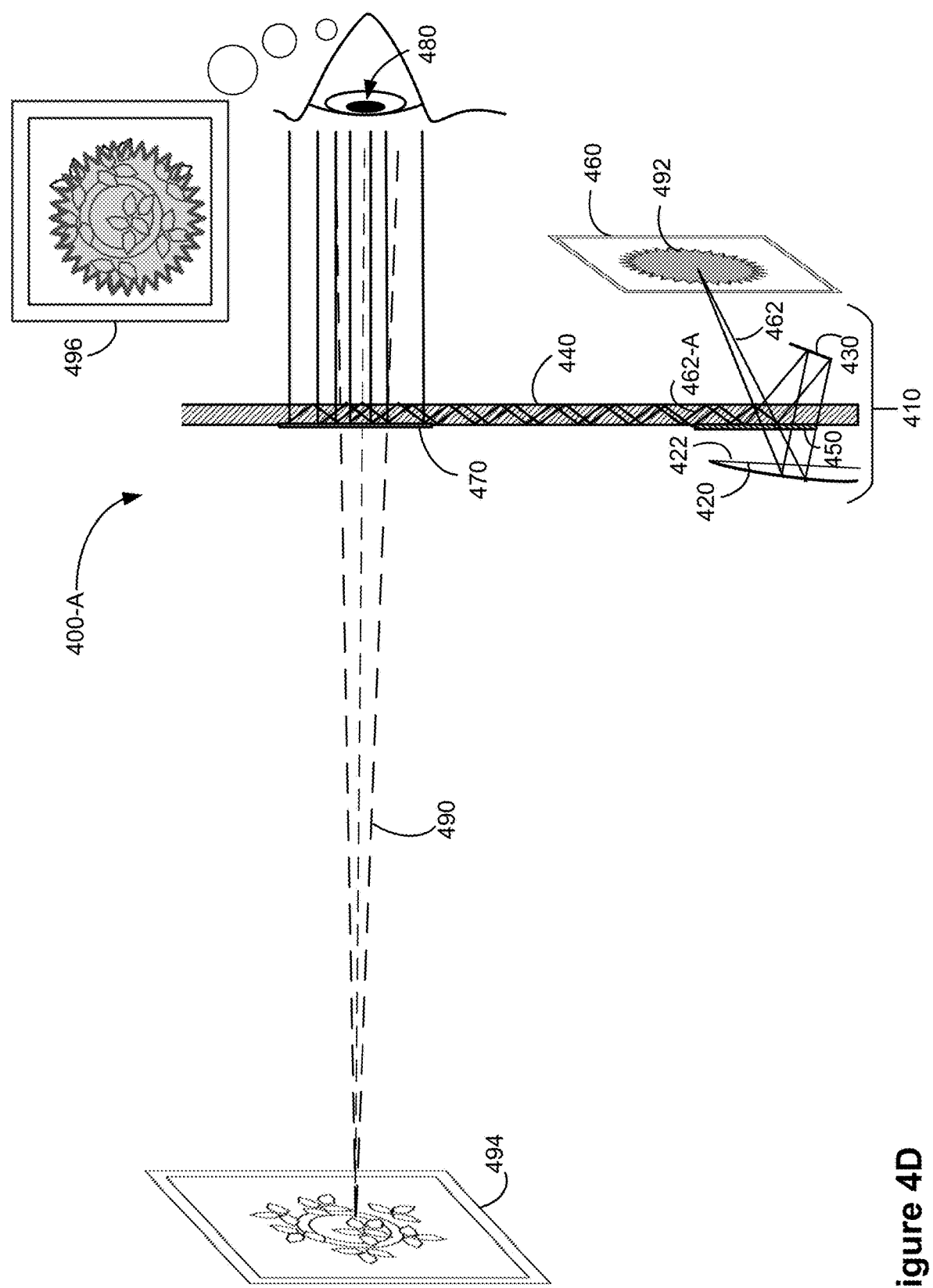
FIG. 4D is a schematic diagram illustrating the display device of FIG. 4A in an augmented reality application in accordance with some embodiments.

FIG. 4D is a schematic diagram illustrating display device 400-A in an augmented reality application, in accordance with some embodiments. As shown in FIG. 4D, image light 462 output by light source 460 corresponds to one or more images (e.g., image 492). As described above with respect to FIG. 4A, optical assembly 410 is configured to project image light 462 output by light source 460 toward eye 480 of the user of display device 400-A. First optical waveguide 440 is further configured as an optical combiner to transmit light from outside display device 400-A, e.g., light 490 from an object 494 positioned outside display device 400-A. In FIG. 4D, object 494 is illustrated as a framed picture that the user of display device 400-A is looking at. Image light 462 output from first optical waveguide 440 is combined, or overlapped, with light 490 from object 494 to form a combined image 496 in the user's eye 480. As a result, the user's perception of object 494 is augmented by image 492 output by light source 460, as shown in FIG. 4D.

As shown in FIG. 4D, one or more output couplers 470 are configured to expand etendue of the light 462 in optical assembly 410. An original input pupil area of light 462 is increased by replication due to multiple interactions with one or more output couplers 470.

Figure 4E:
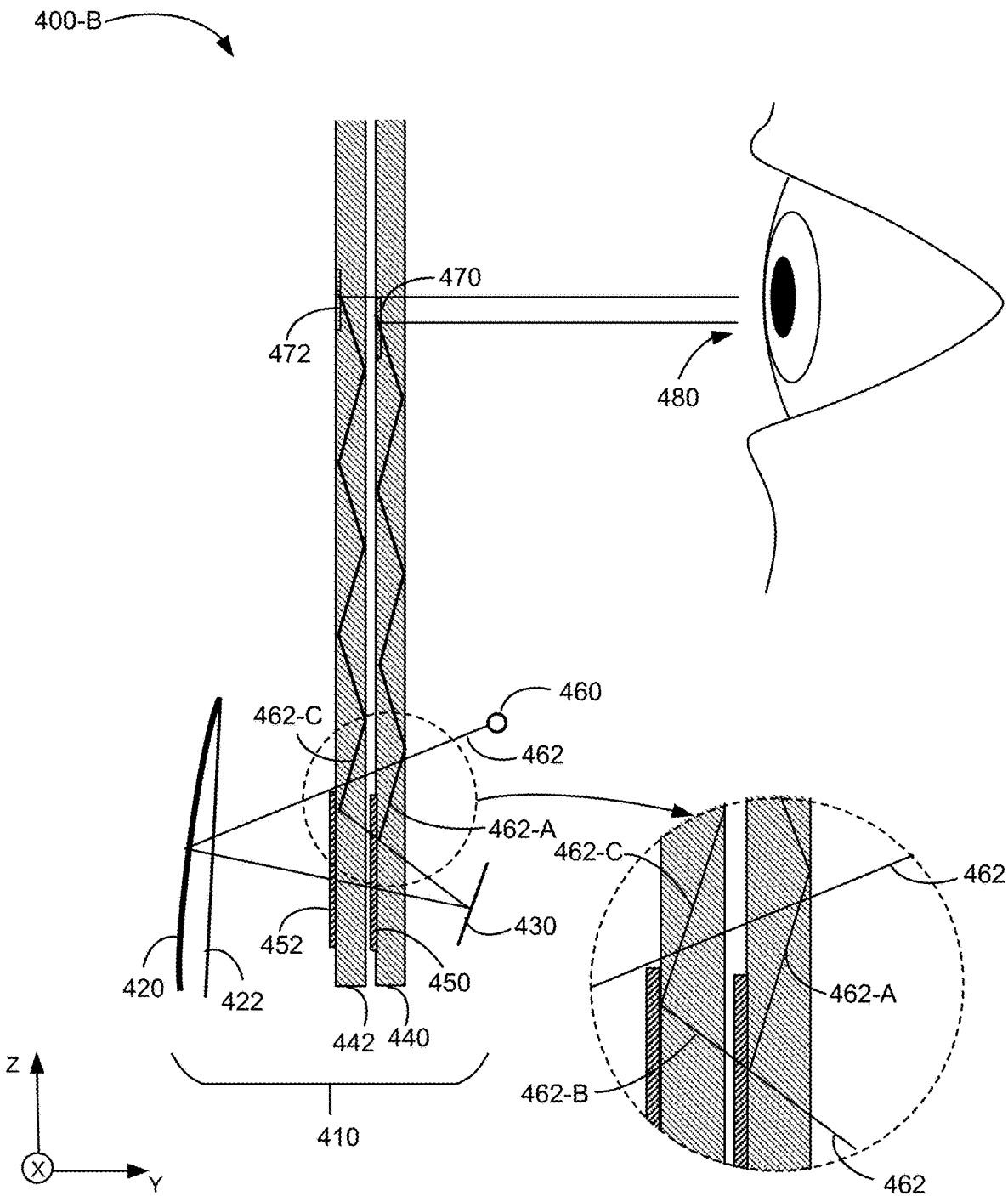
FIG. 4E is a schematic diagram illustrating a display device in accordance with some embodiments.

FIG. 4E is a schematic diagram illustrating display device 400-B in accordance with some embodiments. Display device 400-B corresponds to display device 400-A described above with respect to FIG. 4A, except that optical assembly 410 in display device 400-B further includes second optical waveguide 442 and second in-coupler 452 coupled with second optical waveguide 442. Second optical waveguide 442 is positioned substantially parallel to first optical waveguide 440. In some embodiments, second in-coupler 452 is a liquid crystal based polarization selective element, a polarization selective element including a metasurface, a polarization selective element including a resonant structured surface, a polarization selective element including a continuous chiral layer, or a polarization selective element including a birefringent material. In some embodiments, second in-coupler 452 is a PVG (e.g., a polarization volume grating 700 described below with respect to FIGS. 7A-7D), and is selective with respect to polarization, incident angle, and/or wavelength range, of light incident thereon.

As shown in FIG. 4E, in addition to being polarization selective, first in-coupler 450 is also wavelength selective. In some embodiments, first portion 462-A of image light 462 redirected by first in-coupler 450 is in a first wavelength range. Thus, first in-coupler 450 is further configured to transmit second portion 462-B of image light 462 having a second wavelength range distinct from first wavelength range while redirecting first portion 462-A of image light 462. Second in-coupler 452 is configured to, similar to first in-coupler 450, receive and transmit image light 462 having the first circular polarization. Second in-coupler 452 is further configured to receive second portion 462-B of image light 462 having the second circular polarization and the second wavelength range, and to redirect at least a portion of second portion 462-B of image light 462, i.e., third portion 462-C of image light 462 so that third portion 462-C impinges on a surface of second optical waveguide 442 at incident angle $\theta_2$ that is above a critical angle associated with second optical waveguide 442, as shown in the inset of FIG. 4E. Thus, third portion 462-C would undergo total internal reflection inside second optical waveguide 442 and continue to propagate through the waveguide via a series of total reflection events. In some embodiments, the incident angle $\theta_2$ is distinct from the incident angle $\theta_1$.

In some embodiments, the first wavelength range and the second wavelength range correspond to distinct colors or ranges of colors. For example, the first wavelength range corresponds to red light (e.g., the first wavelength range is from 635 nm through 700 nm corresponding to red color) and the second wavelength range corresponds to green light (e.g., the first wavelength range is from 520 nm through 560 nm corresponding to green color). In some embodiments, the first wavelength range corresponds to a first portion of a first color and a first portion of a second color and the second wavelength range corresponds to a second portion of the first color and a second portion of the second color. For example, the first wavelength range corresponds to a first portion of red light and a first portion of green (e.g., the first wavelength range is from 635 nm through 650 nm and from 520 nm through 540 nm) and the second wavelength range corresponds to a second portion of red light and a second portion of green (e.g., the first wavelength range is from 650 nm through 700 nm and from 540 nm through 560 nm). In some embodiments, the wavelength ranges are a combination of three colors, such as red, green and blue (e.g., a blue color ranging from 450 nm through 490 nm).

Display device 400-B further includes one or more output couplers 472 coupled with second optical waveguide 442. One or more output couplers 472 correspond to one or more output couplers 470 and are configured to redirect at least a portion of respective image light 462-C toward eye 480.

Figure 4F:
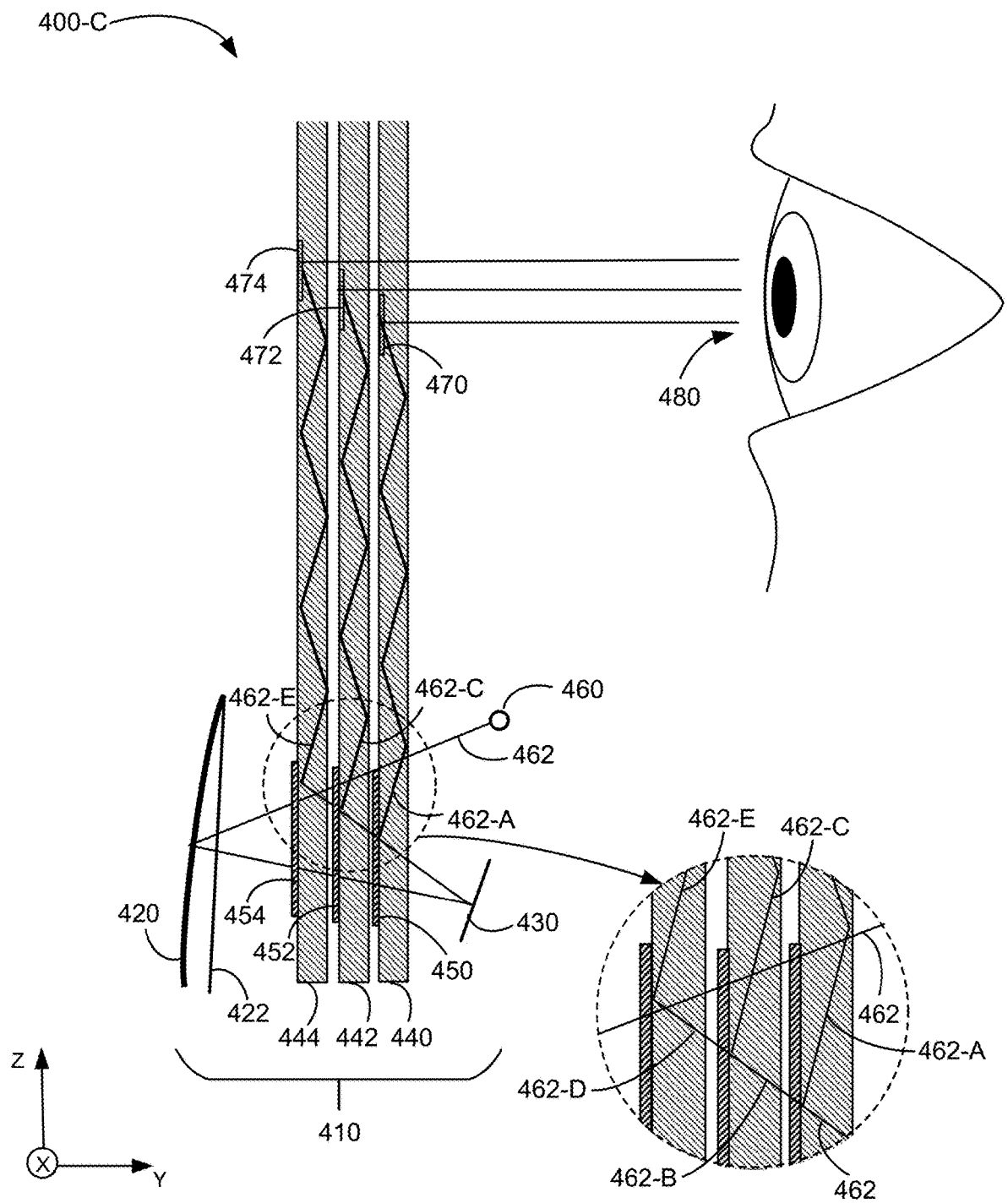
FIG. 4F is a schematic diagram illustrating a display device in accordance with some embodiments.

FIG. 4F is a schematic diagram illustrating display device 400-C in accordance with some embodiments. Display device 400-C corresponds to display device 400-B described above with respect to FIG. 4D, except that optical assembly 410 of display device 400-C includes third optical waveguide 444 and third in-coupler 454 coupled with third optical waveguide 444. Third optical waveguide 444 is positioned substantially parallel to first optical waveguide 442 and second optical waveguide 442. In some embodiments, third in-coupler 454 is a liquid crystal based polarization selective element, a polarization selective element including a metasurface, a polarization selective element including a resonant structured surface, a polarization selective element including a continuous chiral layer, or a polarization selective element including a birefringent material. In some embodiments, third in-coupler 454 is a PVG (e.g., a polarization volume grating 700 described below with respect to FIGS. 7A-7D), and is selective with respect to polarization, incident angle, and/or wavelength range of light incident thereon. Display device 400-C further includes output one or more couplers 472 coupled with second optical waveguide 442. One or more output couplers 472 correspond to one or more output couplers 470 and are configured to redirect at least a portion of respective image light 462-C toward eye 480.

As shown in FIG. 4F, in addition to being polarization selective, second in-coupler 452 is also wavelength selective. In some embodiments, first portion 462-A of image light 462 redirected by first in-coupler 450 is in the first wavelength range and third portion 462-C of image light 462 redirected by second in-coupler 452 is in the second wavelength range. Thus, first in-coupler 450 and second in-coupler 452 are configured to transmit fourth portion 462-D, which is a portion of second portion 462-B of image light 462, having a third wavelength range while respectively redirecting first portion 462-A and third portion 462-C of image light 462, as shown in the inset of FIG. 4F. Third in-coupler 454 is configured to, similarly to first in-coupler 450 and second in-coupler 452, receive and transmit image light 462 having the first circular polarization. Third in-coupler 454 is further configured to receive fourth portion 462-D of image light 462 having the second circular polarization and the third wavelength range, and to redirect at least a portion of fourth portion 462-D of image light 462, i.e., fifth portion 462-E of image light 462, so that fifth portion 462-E impinges on a surface of third optical waveguide 444 at an incident angle $\theta_3$ that is above a critical angle associated with third optical waveguide 444. Thus, fifth portion 462-E of image light 462 would undergo total internal reflection inside third optical waveguide 444 and continue to propagate through the waveguide via a series of total reflection events. In some embodiments, the incident angle $\theta_3$ is distinct from the incident angle $\theta_1$ and/or the incident angle $\theta_2$.

In some embodiments, the first wavelength range, the second wavelength range, and the third wavelength range correspond to distinct colors or ranges of colors. For example, the first wavelength range corresponds to red light, the second wavelength range corresponds to green light, and the third wavelength range corresponds to blue light. In some embodiments, the first wavelength range corresponds to a first portion of a first color, a first portion of a second color, and a first portion of a third color, the second wavelength range corresponds to a second portion of the first color, a second portion of the second color and a third portion of the third color. For example, the first wavelength range corresponds to a first portion of red light, a first portion of green and a first portion of blue (e.g., the first wavelength range is from 635 nm through 650 nm, from 520 nm through 540 nm and from 450 nm through 470 nm), the second wavelength range corresponds to a second portion of red light, a second portion of green light and a second portion of blue light (e.g., the first wavelength range is from 650 nm through 670 nm, from 540 nm through 550 nm, and from 470 nm through 480 nm), and the third wavelength range corresponds to a third portion of red light, a third portion of green light, and a third portion of blue light (e.g., the first wavelength range is from 670 nm through 700 nm, from 550 nm through 560 nm, and from 480 nm through 490 nm).

Display device 400-C further includes one or more couplers output 474 coupled with third optical waveguide 4442. One or more output couplers 474 correspond to one or more output couplers 470 and are configured to redirect at least a portion of respective image light 462-E toward eye 480.

Figure 4H:
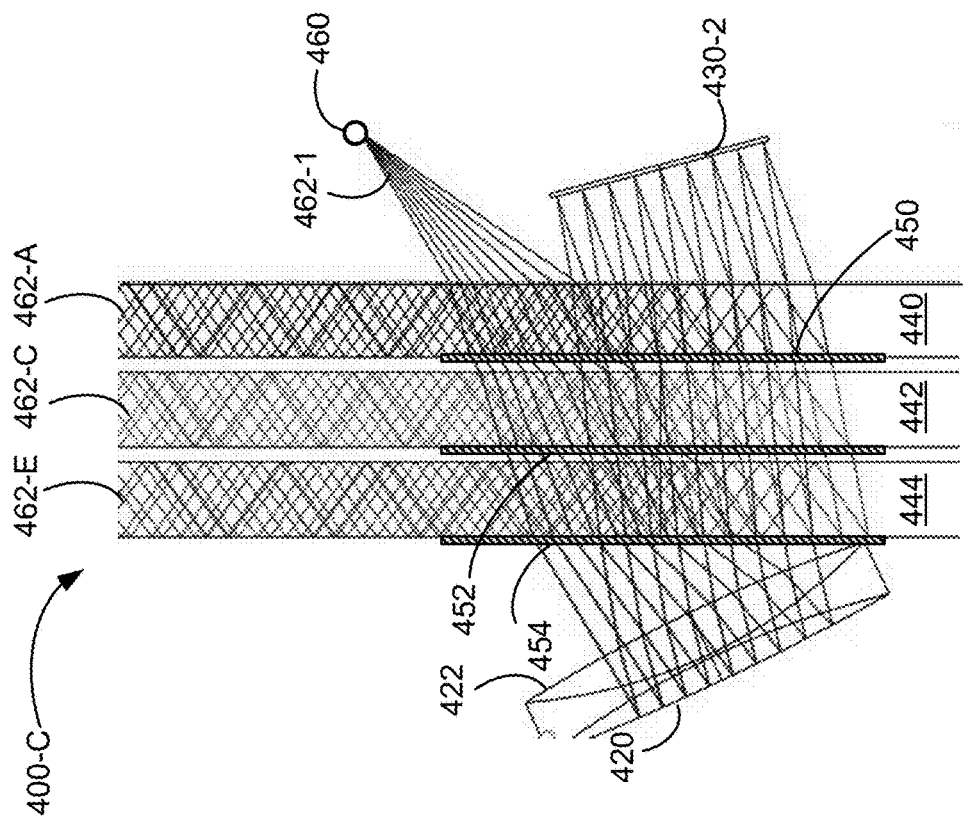
FIGS. 4G-4H are schematic diagrams illustrating the display device of FIG. 4F in accordance with some embodiments.
Figure 4G:
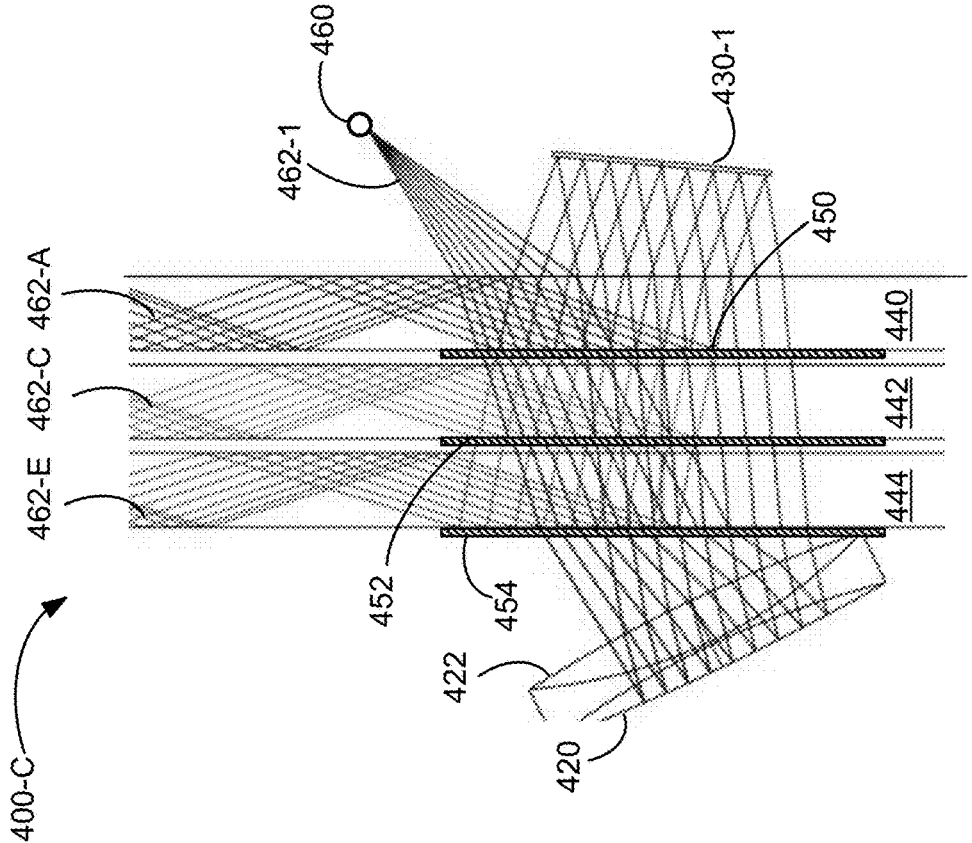

FIGS. 4G-4H are schematic diagrams illustrating display device 400-C in accordance with some embodiments. FIG. 4G shows image light 462 (e.g., rays 462-1) output by light source 460. Rays 462-1 diverge as they propagate from light source 460 to first reflector 420. Image light 462 is focused by first reflector 420 such that the divergence of image light 462 is reduced. In some embodiments, first reflector 420 collimates image light 462, as shown. In FIGS. 4G-4F, image light 462 includes a first wavelength range illustrated with red, a second wavelength range illustrated with green, and a third wavelength range illustrated with blue. First in-coupler 450 is configured to reflect the blue light, second in-coupler 452 is configured to reflect the green light, and third in-coupler 454 is configured to reflect the red light. FIGS. 4G and 4F illustrate the propagation of image light 462 redirected by first scanning reflector 430 to distinct directions. In FIG. 4G, first scanning reflector 430 is in a first tilt position, illustrated as first scanning reflector 430-1, and in FIG. 4H first scanning reflector 430 is in a second tilt position, illustrated as first scanning reflector 430-2.

In some embodiments, a display device includes two or more displays. In some embodiments, such multi-display devices may provide an increased field of view having individual projectors providing image light for distinct portions of an eye of a user. In some embodiments, such multi-display devices may provide an increase field of view (e.g., a first display providing light to a smaller area of the field of view with higher resolution and a second display simultaneously providing light to a larger area of the field of view with a lower resolution). In some embodiments, the multi-display devices include multiple displays outputting light of different colors (e.g., a first display outputting mostly red colored light, a second display outputting mostly blue colored light, and a third display outputting mostly green colored light).

Figure 4I:
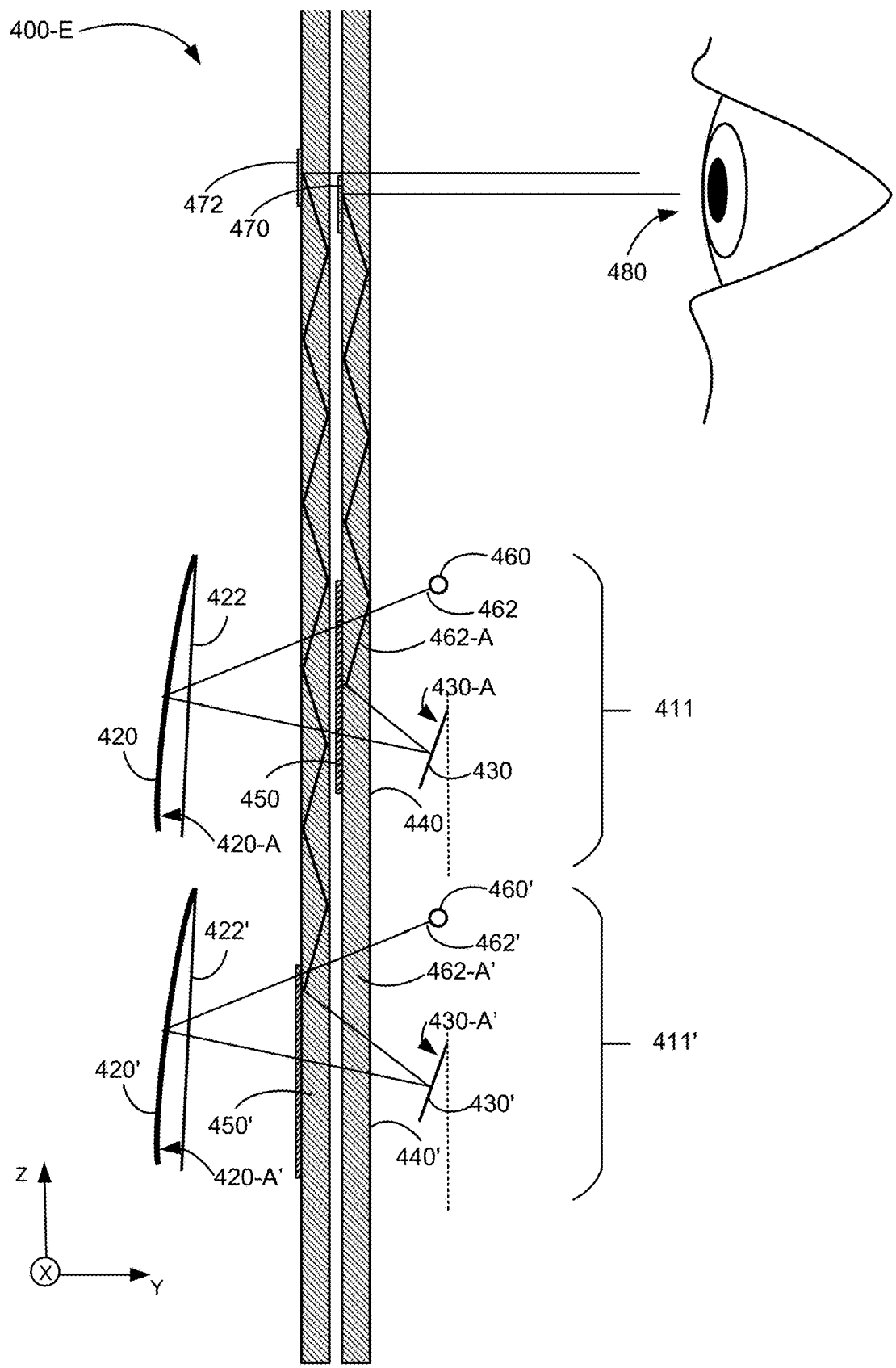
FIG. 4I is a schematic diagram illustrating a display device in accordance with some embodiments.

FIG. 4I is a schematic diagram illustrating display device 400-E in accordance with some embodiments. As shown in FIG. 4H, display device 400-E includes a plurality of display assemblies (e.g., display assemblies 411 and 411') corresponding to respective ones of a plurality of wavelength ranges (e.g., the first wavelength range and the second wavelength range) and a plurality of optical waveguides (e.g., waveguides 440 and 440') corresponding to respective ones of the plurality of display assemblies. In some embodiments, a respective display assembly of the plurality of display assemblies in display device 400-E includes a respective light source configured to output image light in a respective wavelength range, a respective reflector configured to redirect the image light output by the respective light source, a respective scanning reflector configured to redirect the image light in a respective range of directions and a respective in-coupler configured to redirect the image light in the respective wavelength range so that the image light in the respective wavelength range propagates through a portion of the respective optical waveguide by total internal reflection.

For example, display assembly 411 includes light source 460 configured to output image light 462 in the first wavelength range, first reflector 420 coupled with retarder plate 422 configured to receive image light 462 and redirect image light toward first scanning reflector 430, and in-coupler 450 configured to redirect image light 462 reflected of first scanning reflector 430 so that portion 462-A of image light 462 in the first wavelength range propagates through a portion of optical waveguide 440 by total internal reflection. Likewise, display assembly 411' includes light source 460' configured to output image light 462' in the second wavelength range, first reflector 420' coupled with retarder plate 422' configured to receive image light 462' and redirect image light 462' toward first scanning reflector 430', and in-coupler 450' configured to redirect image light 462' reflected of first scanning reflector 430' so that portion 462-A' of image light 462' in the second wavelength range propagates through a portion of optical waveguide 440' by total internal reflection.

In some embodiments, a display device includes two display assemblies (e.g., display assemblies 411 and 411') and a single optical waveguide (e.g., optical waveguide 440) and the two display assemblies are configured to in-couple image light through the single optical waveguide. In some embodiments, a display device includes three display assemblies and one, two, or three optical waveguides.

Figure 4J:
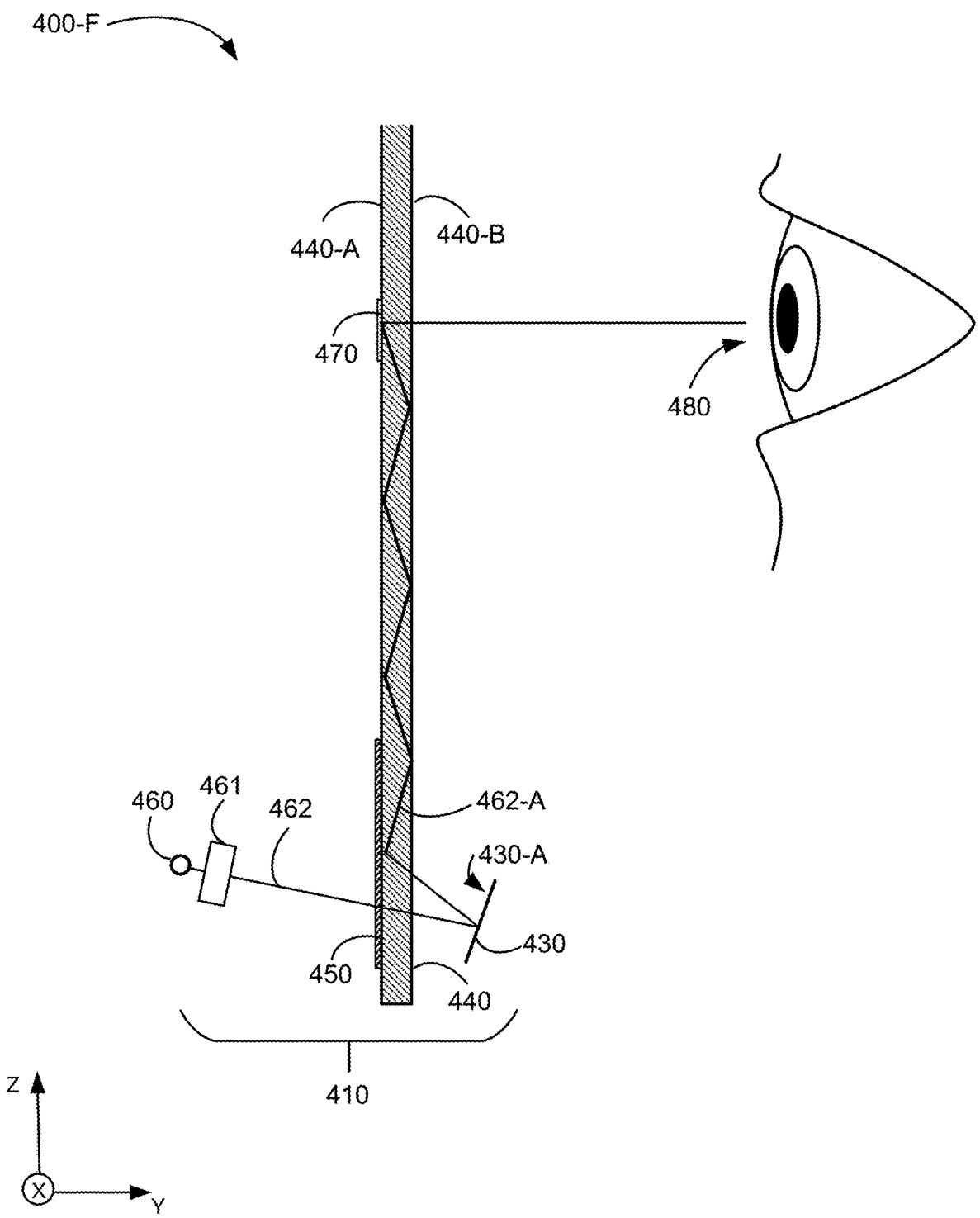
FIG. 4J is a schematic diagram illustrating a display device in accordance with some embodiments.

FIG. 4J is a schematic diagram illustrating display device 400-F in accordance with some embodiments. Display device 400-F corresponds to display device 400-A described above with respect to FIG. 4A, except that optical assembly 410 in FIG. 4J includes collimator 461 instead of first reflector 420. In some embodiments, collimator 461 includes one or more lenses. In some embodiments, collimator 461 includes one or more reflective surfaces. As shown in FIG. 4J, collimator 461 and light source 460 are both disposed on first side 440-A of first optical waveguide 440 such that collimator 461 is disposed between light source 460 and first optical waveguide 440. Collimator 461 is configured to receive image light 462 output by light source 460 and transmit image light 460 through first in-coupler 450 and first optical waveguide 440 to first scanning reflector 430. Collimator 461 is further configured to receive image light 462 output by light source 460 and focus image light 462 such that image light 462 transmitted by collimator 461 is more focused than image light 462 incident on collimator 461. In some embodiments, collimator 461 collimates image light 462. First scanning reflector 430 is configured to receive image light 462 transmitted by collimator 461 and to redirect image light 462 across the first range of directions, as described above with respect to FIG. 4A.

Figure 5A:
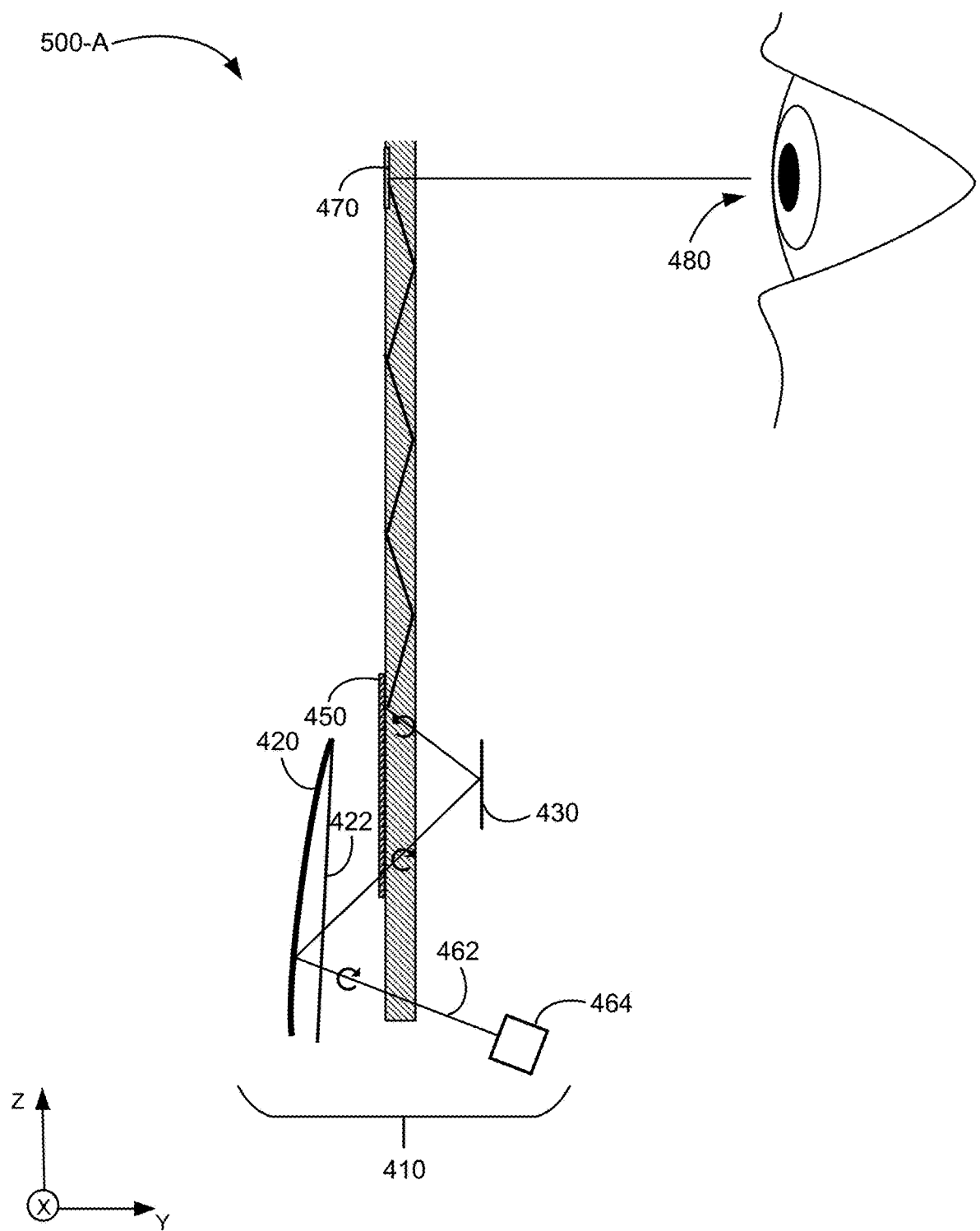
FIG. 5A is a schematic diagram illustrating a display device in accordance with some embodiments.

FIG. 5A is a schematic diagram illustrating display device 500-A in accordance with some embodiments. Display device 500-A corresponds to display device 400-A described above with respect to FIG. 4A, except that display device 500-A includes point light source 464. Point light source 464 is configured to output image light 464 and first scanning reflector 430 is configured to redirect image light 462 in the first range of directions including directions in a first plane and in a second plane that is substantially perpendicular to the first plane. First scanning reflector 430 is configured to scan image light 462 from point source light source 464 across the two planes such that image light 462 received by eye 470 of the user of display device 500-A is perceived as a two-dimensional image.

Figure 5C:
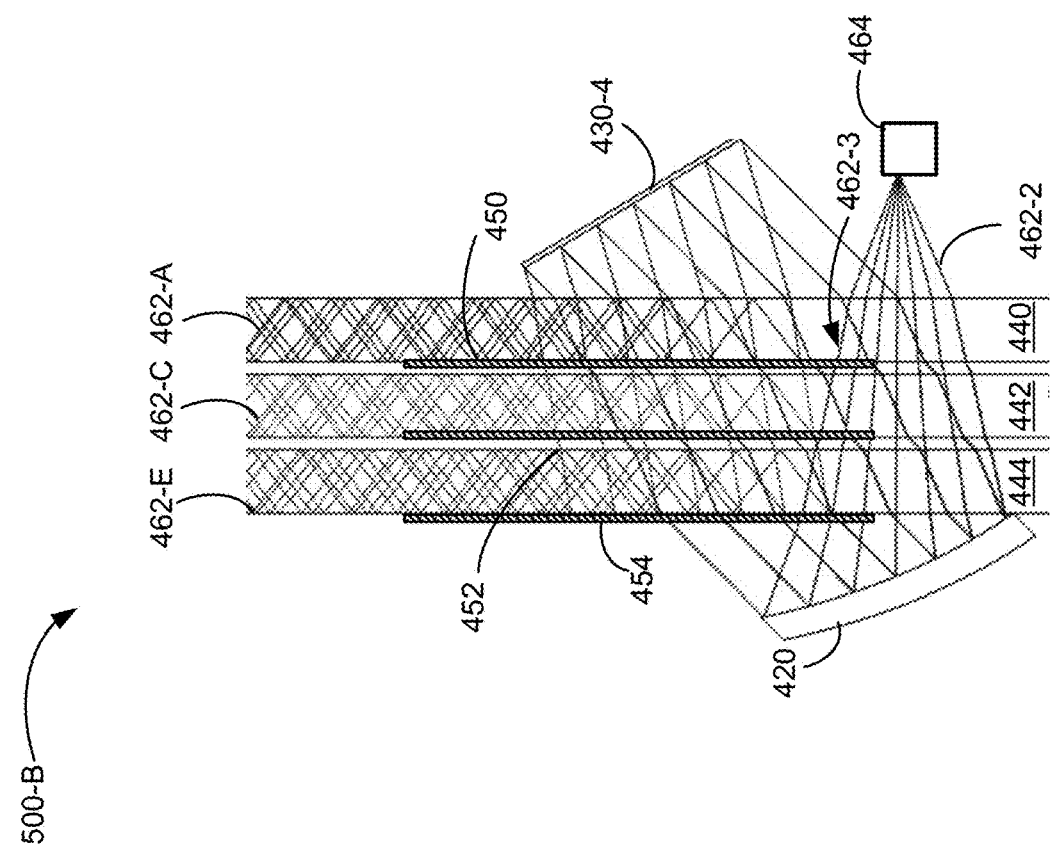
FIGS. 5B-5C are schematic diagrams illustrating a display device of in accordance with some embodiments.
Figure 5B:
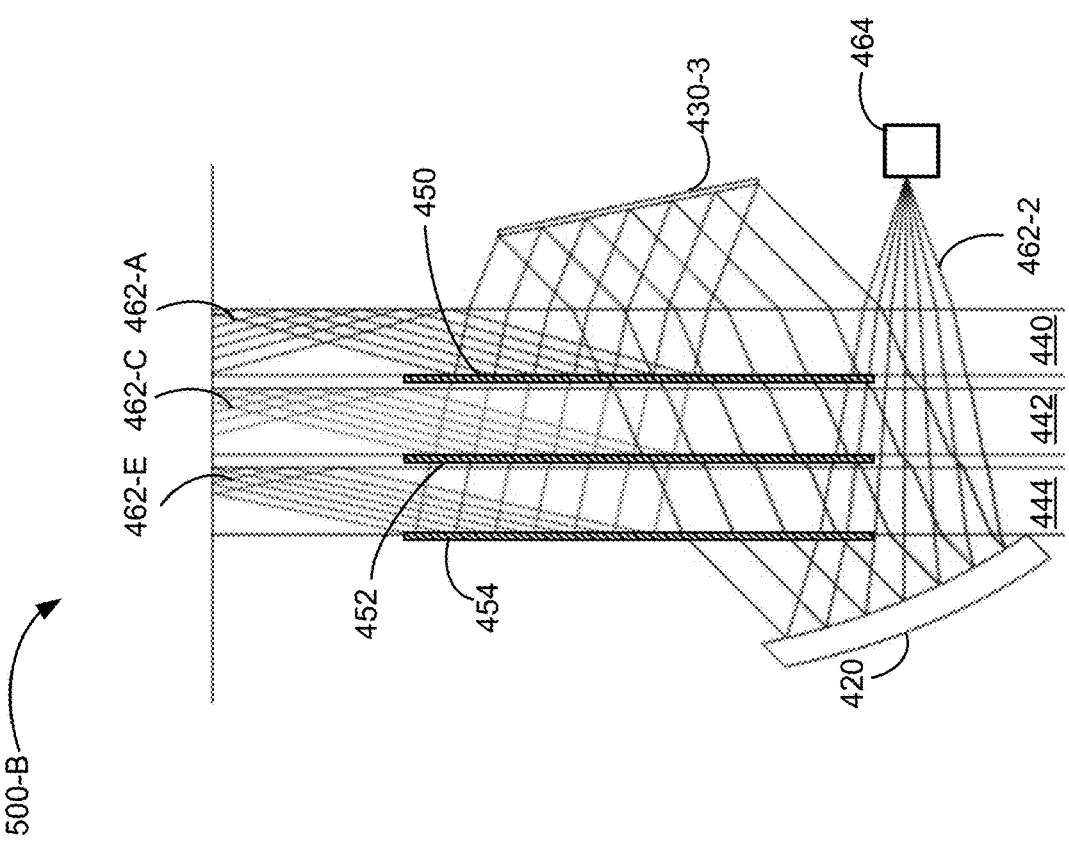

FIGS. 5B-5C are schematic diagrams illustrating display device 500-B in accordance with some embodiments. Display device 500-B corresponds to display device 500-A, except that display device 500-B further includes second in-coupler 452 coupled with second optical waveguide 442 and third in-coupler 454 coupled with third optical waveguide 444. FIG. 5B shows image light 462 including rays 462-2 output by light source 464. Similarly as shown in FIGS. 4G-4G, in FIGS. 5B-5C image light 462 includes a first wavelength range illustrated with red, a second wavelength range illustrated with green, and a third wavelength range illustrated with blue. First in-coupler 450 is configured to reflect the blue light, second in-coupler 452 is configured to reflect the green light, and third in-coupler 454 is configured to reflect the red light. FIGS. 5B and 5C illustrate the propagation of rays 462-2 redirected by first scanning reflector 430 to distinct directions. In FIG. 5B, first scanning reflector 430 is in a third tilt position, illustrated as first scanning reflector 430-3, and in FIG. 5C first scanning reflector 430 is in a fourth tilt position, illustrated as first scanning reflector 430-4.

In-couplers (e.g., first in-coupler 450) in a display device (e.g., display device 500-A) including a point light source (e.g., point light source 464) have a requirement for having a high extinction ratio for polarization selectivity. Extinction ratio refers to an ability of a polarization volume grating (e.g., PVG 700 described below with respect to FIGS. 7A-7D) to diffract only light having a particular circular polarization (e.g., the second circular polarization) while transmitting, and not diffracting, light having an opposite circular polarization (e.g., the first circular polarization). For example, in an instance that in-couplers (e.g., first in-coupler 450, second in-coupler 452, and third in-coupler 454) in FIG. 5C do not have sufficiently high extinction ratios, image light 462 (e.g., ray 462-3) having the first circular polarization propagating from point light source 464 to first reflector 420 could get in-coupled to respective optical waveguides (e.g., first optical waveguide 440, second optical waveguide 442, and third optical waveguide 444) when impinging on the in-couplers. As ray 462-3 is output by the one or more output couplers (e.g., one or more output couplers 470 in FIG. 5A), ray 462-3 is perceived by the user of display device 500-B as an optical artifact corresponding to a bright spot. Therefore, first in-coupler 450, second in-coupler 452, and third in-coupler 454 are PVGs having high extinction ratios for polarization selectivity. In some embodiments, first in-coupler 450, second in-coupler 452, and third in-coupler 454 have extinction ratios (i.e., polarization selectivity) ranging from 1:100 to 1:10,000.

Figure 6A:
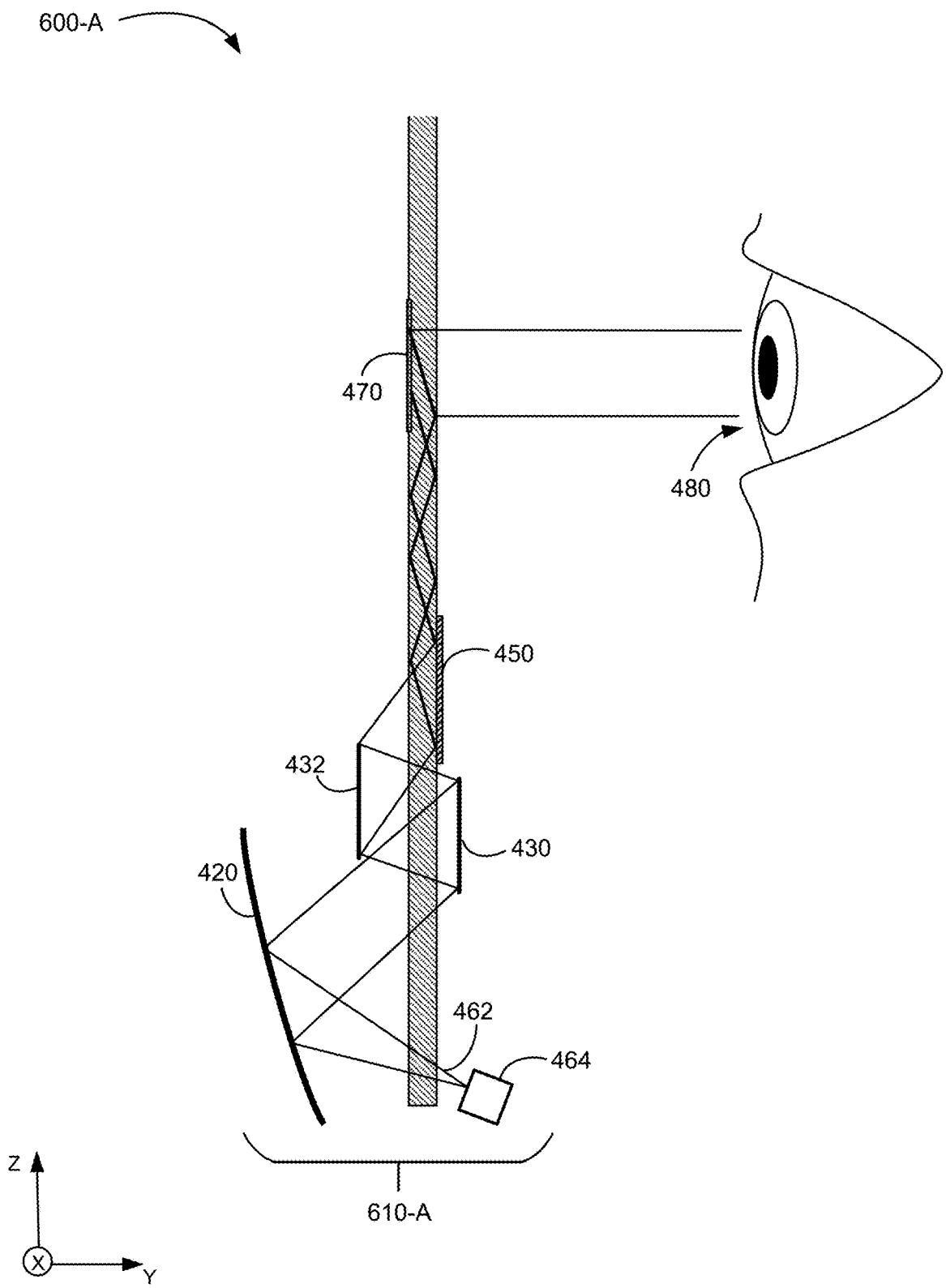
FIG. 6A is a schematic diagram illustrating a display device in accordance with some embodiments.

FIG. 6A is a schematic diagram illustrating display device 600-A in accordance with some embodiments. Display device 500-A corresponds to display device 400-A described above with respect to FIG. 5A, except that optical assembly 610-A of display device 600-A includes second scanning reflector 432. In FIG. 6A, second scanning reflector 432 is configured to receive image light 462 redirected by first scanning reflector 430 that is optically coupled with first scanning reflector 430 and first in-coupler 450. Second scanning reflector 432 is configured to receive image light 462 redirected by first scanning reflector 430 in the first range of directions and to redirect image light 462 across a second range of directions, where the second range of directions is distinct from the first range of directions. First in-coupler 450 is configured to receive image light 462 from second scanning reflector 432.

In some embodiments, image light 462 originates from point light source 462. The first range of directions associated with first scanning reflector 430 includes directions in a first plane and the second range of directions associated with the second scanning reflector 432 includes directions in a second plane that is distinct from the first plane. First scanning reflector 430 and second scanning reflector 432 are configured to redirect image light 462 from point source light source 464 across the first and the second plane such that image light 462 received by eye 470 of the user of the display device 400-A is perceived as a two-dimensional image.

Figure 6B:
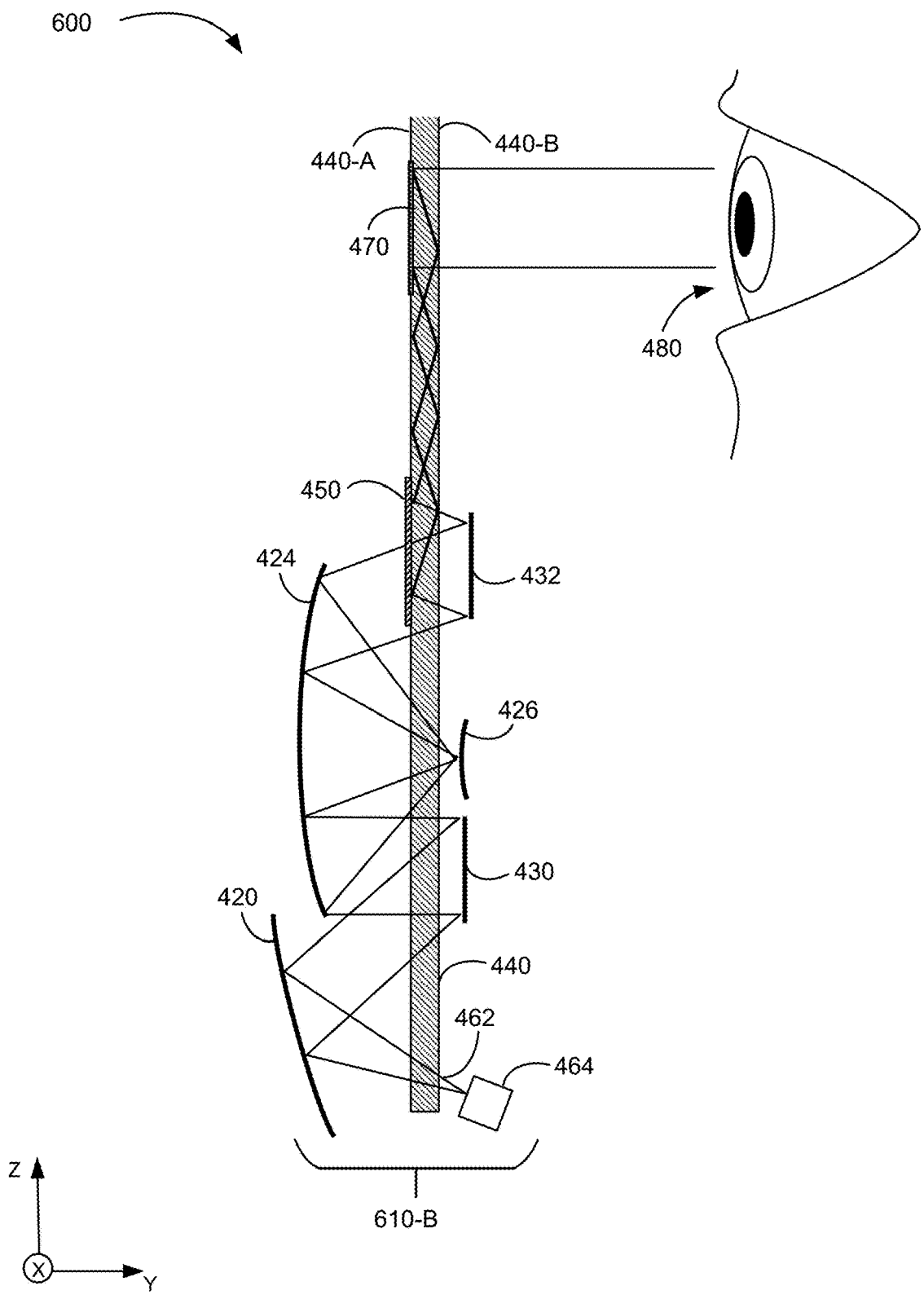
FIG. 6B is a schematic diagram illustrating a display device in accordance with some embodiments.

FIG. 6B is a schematic diagram illustrating display device 600-B in accordance with some embodiments. Display device 600-B corresponds to display device 600-A, except that optical assembly 610-B of display device 600-B includes an Offner relay including first Offner reflector 424 and second Offner reflector 426. First Offner reflector 424 and second Offner reflector 426 are both curved reflectors and they are disposed between first scanning reflector 430 and second scanning reflector 432, which are both disposed on second side 440-B of first optical waveguide 440, as shown in FIG. 6B. The Offner relay is configured to receive image light 462 reflected off first scanning reflector 430 and relay image light 462 to second scanning reflector 432.

FIGS. 7A-7D are schematic diagrams illustrating a polarization volume grating (PVG) 700 in accordance with some embodiments. In some embodiments, PVG corresponds to in-couplers described above with respect to FIGS. 4A, 4E, and 4F (e.g., first in-coupler 450, second in-coupler 452, and third in-coupler 454). In some embodiments, PVG 700 is a liquid crystal PVG including a layer of liquid crystals arranged in helical structures (e.g., a liquid crystal formed of a cholesteric liquid crystal). A PVG adds or removes optical power based in part on polarization of an incident light. PVG is selective with respect to circular polarization of light. When state (handedness) of the circularly polarized light is along a helical axis of a liquid crystal, the PVG interacts with the circularly polarized light and thereby changes the direction of the light (e.g., reflects, refracts or diffracts the light). Concurrently, while changing the direction of the light, the PVG also changes the polarization of the light. In contrast, the PVG transmits light with opposite circular polarization without changing its direction or polarization. For example, a PVG changes polarization of RCP light to LCP light and simultaneously redirects the light while transmitting LCP light without changing its polarization or direction. In some embodiments, a PVG is also selective on wavelength range and/or on an incident angle. If the incident light is at the designed wavelength, RCP light is redirected and converted to LCP light while RCP light with wavelength outside the designed wavelength range is transmitted without its polarization converted. If the incident light has an incident angle at the designed incident angle range, RCP light is converted to LCP light and redirected while RCP light with an incident angle outside the designed incident angle range is transmitted without its polarization converted.

FIG. 7A illustrates a three dimensional view of PVG 700 with incoming light 704 entering the grating along the z-axis. FIG. 7B illustrates an x-y-plane view of PVG 700 with a plurality of liquid crystals (e.g., liquid crystals 702-1 and 702-2) with various orientations. The orientations of the liquid crystals are constant along reference line between D and D' along the x-axis, as shown in FIG. 7D illustrating a detailed plane view of the liquid crystals along the reference line. As shown in FIG. 7C, a pitch defined as a distance along the y-axis at which an azimuth angle of a liquid crystal has rotated 180 degrees is constant throughout the grating. FIG. 7C illustrates a y-z-cross-sectional view of PVG 700. PVG 700 has helical structures 708 with helical axes aligned corresponding to the y-axis. The helical structures create a volume grating with a plurality of diffraction planes (e.g., planes 710-1 and 710-2). The diffraction planes of PVG 700 extend across the grating. In FIG. 7C, diffraction planes 710-1 and 710-2 are tilted with respect to the z-axis. Helical structures 708 define the polarization selectivity of PVG 700, as light with circular polarization handedness corresponding to the helical axes is diffracted while light with circular polarization with the opposite handedness is not diffracted. Helical structures 708 also define the wavelength selectivity of PVG 700, as light with wavelength close to a helical pitch (e.g., helical pitch 712 in FIG. 7C) is diffracted while light with other wavelengths is not diffracted.

In light of these principles, we now turn to certain embodiments of the present disclosure.

In accordance with some embodiments, an optical assembly includes a first optical waveguide (e.g., first optical waveguide 440 in FIG. 4A), a first in-coupler coupled (e.g., first in-coupler 450) with the first optical waveguide and a projector (e.g., a projector including light source 460 and first reflector 420) configured to project image light (e.g., image light 462) toward a first side of the first optical waveguide (e.g., side 440-A of first optical waveguide 440). The optical assembly also includes a first scanning reflector (e.g., first scanning reflector 430) optically coupled with the projector and disposed on a second side (e.g., side 440-B of first optical waveguide 440) of the first optical waveguide that is opposite to the first side. The projector is configured to project image light. The first scanning reflector is configured to receive the image light and to redirect the image light across a first range of directions. The first in-coupler is configured to redirect a first portion of the image light (e.g., first portion 462-A of image light 462) so that the first portion of the image light undergoes total internal reflection inside the first optical waveguide.

In some embodiments, the first in-coupler is selected from the group consisting of: a liquid crystal based polarization selective element, a polarization selective element including a metasurface, a polarization selective element including a resonant structured surface, a polarization selective element including a continuous chiral layer, and a polarization selective element including a birefringent material.

In some embodiments, the liquid crystal based polarization selective element is a polarization volume grating (e.g., first in-coupler 450 in FIG. 4A is PVG grating 700 in FIGS. 7A-7D). In some embodiments, the first scanning reflector includes a micro-electro-mechanical system (MEMS) mirror (e.g., first scanning reflector 430 in FIG. 4A is a MEMS mirror).

In some embodiments, the projector includes a light source (e.g., light source 460) configured to output the image light and one or more reflectors, including a first reflector (e.g., first reflector 420) disposed on the first side of the first optical waveguide. The first scanning reflector is configured to receive the image light reflected off one of the one or more reflectors.

In some embodiments, the image light has a first polarization when incident on the first scanning reflector and the image light having the first polarization is transmitted to the first scanning reflector through the first in-coupler and the first optical waveguide (e.g., FIG. 4C).

In some embodiments, the first in-coupler is a reflective grating configured to redirect the first portion of the image light after the image light enters the first optical waveguide (e.g., reflective grating 450-B in Diagram (II) of FIG. 4B). The redirecting causes the first portion of the image light to impinge on an internal surface of the first optical waveguide at an incident angle that is greater than the critical angle of incidence (e.g., the angle $\theta_1$ is greater than the critical angle of incidence associated with first optical waveguide 440).

In some embodiments, the first reflector has a curved shape, and the first reflector is configured to focus the image light as it is reflected such that the image light reflected off the first reflector is more collimated than the image light received by the first reflector (e.g., image light 462 reflected off first reflector 420 is more collimated than image light 462 incident on first reflector 420 in FIG. 4G).

In some embodiments, the first reflector has a reflecting surface (e.g., reflective surface 420-A) facing the first side of the first optical waveguide and the first scanning reflector has a reflecting surface (e.g., reflective surface 430-A) facing the second side of the first optical waveguide.

In some embodiments, the first polarization is first circular polarization and the optical assembly the optical assembly further includes an optical retarder disposed between the first in-coupler and the first reflector (e.g., optical retarder 422 is disposed between first in-coupler 450 and first reflector 420 in FIG. 4A). The optical retarder is configured to convert the polarization of the image light from first circular polarization to first linear polarization before the image light is incident on the first reflector (e.g., Diagram (I) of FIG. 4C). The optical restarted is also configured to convert the polarization of the image light from the first linear polarization to the first circular polarization after the image light is reflected off the first reflector.

In some embodiments, the image light originates from a linear array of light emitting devices arranged along a first axis (e.g., light source 460 is a linear array of light emitting devices arranged along the x-axis in FIG. 4A). The first range of directions includes directions in a plane perpendicular to the first axis.

In some embodiments, the image light originates from a point source (e.g., point light source 464 in FIG. 5A), and the first range of directions includes first directions in a first plane and second directions in a second plane perpendicular to the first plane.

In some embodiments, the optical assembly further includes a second scanning reflector optically coupled with the first in-coupler (e.g., second scanning reflector 432 in FIG. 6A). The second scanning reflector is configured to redirect the image light across a second range of directions distinct from the first range of directions. The first in-coupler is configured to receive the image light reflected off the second scanning reflector.

In some embodiments, the image light originates from a point source, and the first range of directions includes first directions in a first plane and the second range of directions includes second directions in a second plane distinct from the first plane (e.g., FIG. 6A).

In some embodiments, the second scanning reflector is disposed on the second side of the first optical waveguide (e.g., second scanning reflector 432 is disposed on second side 440-B if first optical waveguide 440 in FIG. 6B), and the optical assembly further includes an Offner relay disposed between the first scanning reflector and the second scanning reflector (e.g., the Offner relay includes the first Offner reflector 424 and the second Offner reflector 426). The Offner relay is configured to receive the image light reflected off the first scanning reflector and relay the image light to the second scanning reflector.

In some embodiments, the projector includes a light source (e.g., light source 460 in FIG. 4J) configured to output the image light and a collimator (e.g., collimator 461) optically coupled with the light source. The light source and the collimator are disposed on the first side of the first optical waveguide (e.g., side 440-A of first optical waveguide 440). The scanning reflector is configured to receive the image light output by the light source and transmitted through the collimator.

In accordance with some embodiments, a display device (e.g., display device 400-A in FIG. 4A) includes a display configured to project image light, a first optical waveguide, a first in-coupler coupled with the first optical waveguide and a projector configured to project image light toward a first side of the first optical waveguide. The display device also includes a first scanning reflector optically coupled with the projector disposed on a second side of the first optical waveguide that is opposite to the first side. The projector is configured to project image light. The first scanning reflector is configured to receive the image light and to redirect the image light across a first range of directions. The first in-coupler is configured to redirect a first portion of the image light so that the first portion of the image light undergoes total internal reflection inside the first optical waveguide.

In some embodiments, the projector includes a light source configured to output the image light and one or more reflectors (e.g., the projector includes light source 460 and first reflector 420 in FIG. 4A), including a first reflector disposed on the first side of the first optical waveguide. The first scanning reflector is configured to receive the image light reflected off one of the one or more reflectors.

In some embodiments, the display device further includes one or more output couplers (e.g., one or more output couplers 470 in FIG. 4A) coupled with the first optical waveguide and positioned at a distance from the first in-coupler. The image light projected by the display corresponds to one or more images (e.g., image light 460 corresponds to image 492 in FIG. 4D). The first optical waveguide is further configured to transmit light from an object outside the display device (e.g., light 490 from object 494). The one or more output couplers are configured to redirect the first portion of the image light out of the first optical waveguide such that the first portion of the image light is combined with the light from the object and perceived by a user of the display device together with the object (e.g., combined image 496).

In some embodiments, the display device is a head-mounted display device (e.g., display device 100 in FIG. 1).

In some embodiments, the image light has a first polarization when incident on the first scanning reflector and the image light having the first polarization is transmitted to the first scanning reflector through the first in-coupler and the first optical waveguide (e.g., FIG. 4A).

In accordance with some embodiments, a method for projecting image light includes projecting, with a projector, image light toward a first side of a first optical waveguide and receiving, with a first scanning reflector, the image light. The method also includes redirecting, with the first scanning reflector, the image light across a first range of directions toward a first in-coupler coupled to the first optical waveguide and redirecting, with the first in-coupler, a first portion of the image light so that the first portion of the image light undergoes total internal reflection inside the first optical waveguide. The first scanning reflector is disposed on a second side of the first optical waveguide that is opposite to the first side.

In accordance with some embodiments, an optical assembly (e.g., optical assembly 410 in FIG. 4A) for projecting image light (e.g., image light 462) includes a first optical waveguide (e.g., first optical waveguide 440), a first in-coupler (e.g., first in-coupler 450) coupled with the first optical waveguide, one or more reflectors (e.g., first reflector 420), and a first scanning reflector (e.g., first scanning reflector 430) optically coupled with the one or more reflectors. The one or more reflectors include a first reflector disposed on a first side of the first optical waveguide (e.g., first side 440-A of optical waveguide 440). The first scanning reflector is disposed on a second side of the first optical waveguide that is opposite to the first side (e.g., second side 440-B of optical waveguide 440). The one or more reflectors are configured to reflect the image light. The first scanning reflector is configured to receive the image light reflected off one of the one or more reflectors and to redirect the image light across a first range of directions. The first in-coupler is configured to redirect a first portion of the image light (e.g., first portion 462-A of image light 462) so that the first portion of the image light undergoes total internal reflection inside the first optical waveguide.

In accordance with some embodiments, a display device (e.g., display device 400-A in FIG. 4A) includes a display configured to project image light, a first optical waveguide, a first in-coupler coupled with the first optical waveguide, one or more reflectors, and a first scanning reflector optically coupled with the one or more reflectors. The one or more reflectors include a first reflector disposed on a first side of the first optical waveguide and the first scanning reflector is disposed on a second side of the first optical waveguide that is opposite to the first side. The one or more reflectors are configured to reflect the image light. The first scanning reflector is configured to receive the image light reflected off one of the one or more reflectors and to redirect the image light across a first range of directions. The first in-coupler is configured to redirect a first portion of the image light so that the first portion of the image light undergoes total internal reflection inside the first optical waveguide. In accordance with some embodiments, a method for projecting image light includes reflecting the image light with one or more reflectors and receiving, with a first scanning reflector optically coupled with the one or more reflectors, the image light reflected off one of the one or more reflectors (e.g., FIG. 4A). The method includes redirecting, with the first scanning reflector, the image light across a first range of directions toward a first in-coupler coupled to a first optical waveguide. The method includes redirecting, with the first in-coupler, a first portion of the image light so that the first portion of the image light undergoes total internal reflection inside the first optical waveguide. The one or more reflectors include a first reflector disposed on a first side of the first optical waveguide, and the first scanning reflector is disposed on a second side of the first optical waveguide that is opposite to the first side.

Although various drawings illustrate operations of particular components or particular groups of components with respect to one eye, a person having ordinary skill in the art would understand that analogous operations can be performed with respect to the other eye or both eyes. For brevity, such details are not repeated herein. Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical assembly, comprising:
   a first optical waveguide;
   a first in-coupler coupled with the first optical waveguide;
   a projector positioned to project image light toward a first side of the first optical waveguide, wherein the projector includes:
      one or more reflectors including a first reflector disposed on the first side of the first optical waveguide; and
      a light source disposed on a second side of the first optical waveguide that is opposite to the first side and positioned to output the image light; and
   a first scanning reflector optically coupled with the projector and disposed on the second side of the first optical waveguide;
   wherein:
      the first scanning reflector is positioned to receive the image light reflected off at least one of the one or more reflectors,
      the first scanning reflector is positioned to receive the image light and to redirect the image light across a first range of directions, and
      the first in-coupler is positioned to redirect a first portion of the image light so that the first portion of the image light undergoes total internal reflection inside the first optical waveguide.

2. The optical assembly of claim 1, wherein the first in-coupler is selected from the group consisting of: a liquid crystal based polarization selective element, a polarization selective element including a metasurface, a polarization selective element including a resonant structured surface, a polarization selective element including a continuous chiral layer, and a polarization selective element including a birefringent material.

3. The optical assembly of claim 2, wherein the liquid crystal based polarization selective element is a polarization volume grating.

4. The optical assembly of claim 1, wherein the first scanning reflector includes a micro-electro-mechanical system (MEMS) mirror.

5. The optical assembly of claim 1, wherein:
   the image light has a first polarization when incident on the first scanning reflector; and
   the image light having the first polarization is transmitted to the first scanning reflector through the first in-coupler and the first optical waveguide.

6. The optical assembly of claim 5, wherein the first in-coupler is a reflective grating configured to redirect the first portion of the image light after the image light enters the first optical waveguide, causing the first portion of the image light to impinge on an internal surface of the first optical waveguide at an incident angle that is greater than a critical angle of incidence.

7. The optical assembly of claim 1, wherein the first reflector has a curved shape, and the first reflector is configured to focus the image light as it is reflected such that the image light reflected off the first reflector is more collimated than the image light received by the first reflector.

8. The optical assembly of claim 1, wherein:
   the first reflector has a reflecting surface facing the first side of the first optical waveguide; and
   the first scanning reflector has a reflecting surface facing the second side of the first optical waveguide.

9. The optical assembly of claim 1, wherein:
   the image light originates from a linear array of light emitting devices arranged along a first axis, and
   the first range of directions includes directions in a plane perpendicular to the first axis.

10. The optical assembly of claim 1, wherein:
    the image light originates from a point source, and
    the first range of directions includes first directions in a first plane and second directions in a second plane perpendicular to the first plane.

11. The optical assembly of claim 1, further including a second scanning reflector optically coupled with the first in-coupler, wherein:
    the second scanning reflector is configured to redirect the image light across a second range of directions distinct from the first range of directions, and wherein the first in-coupler is configured to receive the image light reflected off the second scanning reflector.

12. The optical assembly of claim 11, wherein:
    the image light originates from a point source, and the first range of directions includes first directions in a first plane and the second range of directions includes second directions in a second plane distinct from the first plane.

13. The optical assembly of claim 11, wherein:
the second scanning reflector is disposed on the second side of the first optical waveguide, and
the optical assembly further includes an Offner relay disposed between the first scanning reflector and the second scanning reflector, the Offner relay configured to:
receive the image light reflected off the first scanning reflector; and
relay the image light to the second scanning reflector.

14. A display device, comprising:
the optical assembly of claim 1, and
a display configured to project the image light.

15. The display device of claim 14, further comprising one or more output couplers coupled with the first optical waveguide and positioned at a distance from the first in-coupler, wherein:
the image light projected by the display corresponds to one or more images;
the first optical waveguide is further configured to transmit light from an object outside the display device; and
the one or more output couplers are configured to redirect the first portion of the image light out of the first optical waveguide such that the first portion of the image light is combined with the light from the object and perceived by a user of the display device together with the object.

16. An optical assembly comprising:
a first optical waveguide;
a first in-coupler coupled with the first optical waveguide;
a projector positioned to project image light toward a first side of the first optical waveguide, wherein the projector includes:
a light source positioned to output the image light; and
one or more reflectors, including a first reflector disposed on the first side of the first optical waveguide; and
a first scanning reflector optically coupled with the projector and disposed on a second side of the first optical waveguide that is opposite to the first side,
wherein:
the first scanning reflector is positioned to receive the image light reflected off one of the one or more reflectors and to redirect the image light across a first range of directions,
the first in-coupler is positioned to redirect a first portion of the image light so that the first portion of the image light undergoes total internal reflection inside the first optical waveguide,
the optical assembly further includes an optical retarder disposed between the first in-coupler and the first reflector, the optical retarder positioned to:
convert a polarization of the image light from a first circular polarization to a first linear polarization before the image light is incident on the first reflector, and convert the polarization of the image light from the first linear polarization to the first circular polarization after the image light is reflected off the first reflector.

17. The optical assembly of claim 16, wherein the projector includes:
a light source configured to output the image light; and
a collimator optically coupled with the light source; and
wherein:
the light source and the collimator are disposed on the first side of the first optical waveguide; and
the first scanning reflector is configured to receive the image light output by the light source and transmitted through the collimator.

18. A method for projecting image light, the method comprising:
projecting, with a projector, image light toward a first side of a first optical waveguide wherein the projector includes:
one or more reflectors including a first reflector disposed on the first side of the first optical waveguide; and
a light source disposed on a second side of the first optical waveguide that is opposite to the first side and positioned to output the image light;
receiving, with a first scanning reflector, the image light reflected off at least one of the one or more reflectors;
redirecting, with the first scanning reflector, the image light across a first range of directions toward a first in-coupler coupled to the first optical waveguide; and
redirecting, with the first in-coupler, a first portion of the image light so that the first portion of the image light undergoes total internal reflection inside the first optical waveguide;
wherein the first scanning reflector is disposed on the second side of the first optical waveguide that is opposite to the first side.

* * * * *